United States Patent
Kumar et al.

(10) Patent No.: US 8,370,006 B2
(45) Date of Patent: Feb. 5, 2013

(54) METHOD AND APPARATUS FOR OPTIMIZING A TRAIN TRIP USING SIGNAL INFORMATION

(75) Inventors: Ajith Kuttannair Kumar, Erie, PA (US); Wolfgang Daum, Erie, PA (US); Tom Otsubo, Oak Grove, MO (US); John Erik Hershey, Ballston Lake, NY (US); Gerald James Hess, Lenexa, KS (US)

(73) Assignee: General Electric Company, Schenectady, NY (US)

( * ) Notice: Subject to any disclaimer, the term of this patent is extended or adjusted under 35 U.S.C. 154(b) by 1609 days.

(21) Appl. No.: 11/608,066

(22) Filed: Dec. 7, 2006

(65) Prior Publication Data

US 2007/0219681 A1 Sep. 20, 2007

(51) Int. Cl.
*G06F 7/00* (2006.01)
*G06F 17/00* (2006.01)

(52) U.S. Cl. .............................. 701/19; 701/20; 701/400

(58) Field of Classification Search .................... 701/19, 701/20, 200, 400; 246/182 C, 187 R, 182 A, 246/182 R, 186
See application file for complete search history.

(56) References Cited

U.S. PATENT DOCUMENTS

| | | | |
|---|---|---|---|
| 2,104,652 A | 1/1938 | Inman | |
| 2,601,634 A | 6/1952 | Rivette | |
| 2,927,711 A | 3/1960 | Naggiar | |
| 3,781,139 A | 12/1973 | Lohse | |
| 3,794,833 A | 2/1974 | Blazek et al. | |
| 3,886,870 A | 6/1975 | Pelabon | |
| 3,948,314 A | 4/1976 | Creswick et al. | |
| 4,136,432 A | 1/1979 | Melley, Jr. | |

(Continued)

FOREIGN PATENT DOCUMENTS

| | | |
|---|---|---|
| CH | 642 418 | 4/1984 |
| DE | 197 26 542 | 11/1998 |

(Continued)

OTHER PUBLICATIONS

Razouqi et al. RYNSORD: A Novel, Decentralized Algorithm for Railway Networks with 'Soft Reservation', VTC, 1998, pp. 1585-2589, V3, New York, NY.

(Continued)

*Primary Examiner* — Khoi Tran
*Assistant Examiner* — Jorge Peche
(74) *Attorney, Agent, or Firm* — GE Global Patent Operation; John A. Kramer

(57) ABSTRACT

One embodiment of the invention includes a system for operating a railway network comprising a first railway vehicle (400) during a trip along track segments (401/412/420). The system comprises a first element (65) for determining travel parameters of the first railway vehicle (400), a second element (65) for determining travel parameters of a second railway vehicle (418) relative to the track segments to be traversed by the first vehicle during the trip, a processor (62) for receiving information from the first (65) and the second (65) elements and for determining a relationship between occupation of a track segment (401/412/420) by the second vehicle (418) and later occupation of the same track segment by the first vehicle (400) and an algorithm embodied within the processor (62) having access to the information to create a trip plan that determines a speed trajectory for the first vehicle (400), wherein the speed trajectory is responsive to the relationship and further in accordance with one or more operational criteria for the first vehicle (400).

43 Claims, 10 Drawing Sheets

U.S. PATENT DOCUMENTS

| | | | |
|---|---|---|---|
| 4,548,164 A | 10/1985 | Ylonen et al. | |
| 4,617,627 A * | 10/1986 | Yasunobu et al. | 701/20 |
| 4,644,705 A | 2/1987 | Saccomani et al. | |
| 4,663,713 A | 5/1987 | Cornell et al. | |
| 4,843,575 A | 6/1989 | Crane | |
| 5,181,541 A | 1/1993 | Bodenheimer | |
| 5,187,945 A | 2/1993 | Dixon | |
| 5,197,627 A | 3/1993 | Disabato et al. | |
| 5,239,472 A | 8/1993 | Long et al. | |
| 5,240,416 A | 8/1993 | Bennington | |
| 5,253,153 A | 10/1993 | Mathews et al. | |
| 5,316,174 A | 5/1994 | Schutz | |
| 5,363,787 A | 11/1994 | Konopasek et al. | |
| 5,388,034 A | 2/1995 | Allen et al. | |
| 5,460,013 A | 10/1995 | Thomsen | |
| 5,487,516 A * | 1/1996 | Murata et al. | 246/182 C |
| 5,623,413 A | 4/1997 | Matheson et al. | |
| 5,642,827 A | 7/1997 | Madsen | |
| 5,651,330 A | 7/1997 | Jewett | |
| 5,755,349 A | 5/1998 | Brundle | |
| 5,794,172 A | 8/1998 | Matheson et al. | |
| 5,803,411 A | 9/1998 | Ackerman et al. | |
| 5,957,571 A | 9/1999 | Koster et al. | |
| 5,998,915 A | 12/1999 | Scholz et al. | |
| 6,092,021 A | 7/2000 | Ehlbeck et al. | |
| 6,123,111 A | 9/2000 | Nathan et al. | |
| 6,129,025 A | 10/2000 | Minakami et al. | |
| 6,198,993 B1 * | 3/2001 | Higashi et al. | 701/23 |
| 6,216,957 B1 | 4/2001 | Turunen, Jr. | |
| 6,230,668 B1 | 5/2001 | Marsh et al. | |
| 6,243,694 B1 | 6/2001 | Bonissone et al. | |
| 6,263,266 B1 | 7/2001 | Hawthorne | |
| 6,270,040 B1 * | 8/2001 | Katzer | 246/1 R |
| 6,325,050 B1 | 12/2001 | Gallagher et al. | |
| 6,332,106 B1 | 12/2001 | Hawthorne et al. | |
| 6,363,331 B1 | 3/2002 | Kyrtsos | |
| 6,380,639 B1 | 4/2002 | Soucy | |
| 6,404,129 B1 | 6/2002 | Hendricx et al. | |
| 6,434,452 B1 | 8/2002 | Gray | |
| 6,459,964 B1 | 10/2002 | Vu et al. | |
| 6,520,124 B2 | 2/2003 | Bohm, II | |
| 6,549,803 B1 | 4/2003 | Raghavan et al. | |
| 6,647,328 B2 | 11/2003 | Walker | |
| 6,676,089 B1 * | 1/2004 | Katzer | 246/1 R |
| 6,698,913 B2 | 3/2004 | Yamamoto | |
| 6,702,235 B2 * | 3/2004 | Katzer | 246/1 R |
| 6,873,888 B2 | 3/2005 | Kumar | |
| 6,910,792 B2 | 6/2005 | Takada et al. | |
| 6,948,837 B2 | 9/2005 | Suzuki | |
| 6,953,272 B2 | 10/2005 | Hayakawa et al. | |
| 6,973,947 B2 | 12/2005 | Penaloza et al. | |
| 7,072,747 B2 | 7/2006 | Armbruster et al. | |
| 7,072,757 B2 | 7/2006 | Adams et al. | |
| 7,073,753 B2 | 7/2006 | Root et al. | |
| 7,096,171 B2 | 8/2006 | Hawthorne et al. | |
| 7,131,403 B1 | 11/2006 | Banga et al. | |
| 7,164,975 B2 | 1/2007 | Bidaud | |
| 7,302,895 B2 | 12/2007 | Kumar et al. | |
| 7,347,168 B2 | 3/2008 | Reckels et al. | |
| 7,349,797 B2 | 3/2008 | Donnelly et al. | |
| 7,497,201 B2 | 3/2009 | Hollenbeck | |
| 7,500,436 B2 | 3/2009 | Kumar et al. | |
| 7,509,193 B2 | 3/2009 | Kustosch | |
| 7,522,990 B2 | 4/2009 | Daum et al. | |
| 7,618,011 B2 | 11/2009 | Oleski et al. | |
| 7,667,611 B2 | 2/2010 | Lindsey et al. | |
| 2001/0029411 A1 * | 10/2001 | Hawthorne | 701/19 |
| 2001/0047241 A1 | 11/2001 | Khavakh et al. | |
| 2002/0072833 A1 | 6/2002 | Gray | |
| 2002/0093201 A1 | 7/2002 | Soucy | |
| 2002/0107618 A1 | 8/2002 | Deguchi et al. | |
| 2002/0174653 A1 | 11/2002 | Uzkan | |
| 2003/0001050 A1 * | 1/2003 | Katzer | 246/1 R |
| 2003/0034423 A1 * | 2/2003 | Hess et al. | 246/167 R |
| 2003/0076221 A1 | 4/2003 | Akiyama et al. | |
| 2003/0091017 A1 | 5/2003 | Davenport et al. | |
| 2003/0104899 A1 | 6/2003 | Keller | |
| 2003/0105561 A1 * | 6/2003 | Nickles et al. | 701/19 |
| 2003/0120400 A1 | 6/2003 | Ahmed Baig et al. | |
| 2003/0183729 A1 | 10/2003 | Root et al. | |
| 2003/0222981 A1 | 12/2003 | Kisak et al. | |
| 2003/0229446 A1 | 12/2003 | Boscamp et al. | |
| 2003/0233959 A1 | 12/2003 | Kumar | |
| 2004/0010432 A1 * | 1/2004 | Matheson et al. | 705/7 |
| 2004/0068359 A1 | 4/2004 | Neiss et al. | |
| 2004/0098142 A1 | 5/2004 | Warren et al. | |
| 2004/0104312 A1 | 6/2004 | Hess, Jr. et al. | |
| 2004/0108814 A1 | 6/2004 | Tsuda et al. | |
| 2004/0122569 A1 | 6/2004 | Bidaud | |
| 2004/0129289 A1 | 7/2004 | Hafemann | |
| 2004/0172175 A1 | 9/2004 | Julich et al. | |
| 2004/0174121 A1 | 9/2004 | Tsuda et al. | |
| 2005/0007020 A1 | 1/2005 | Tsuda et al. | |
| 2005/0055287 A1 | 3/2005 | Schmidtberg et al. | |
| 2005/0085961 A1 | 4/2005 | Kane et al. | |
| 2005/0109882 A1 | 5/2005 | Armbruster et al. | |
| 2005/0121005 A1 | 6/2005 | Edwards | |
| 2005/0171655 A1 | 8/2005 | Flynn et al. | |
| 2005/0171657 A1 | 8/2005 | Kumar | |
| 2005/0188745 A1 | 9/2005 | Staphanos et al. | |
| 2005/0196737 A1 | 9/2005 | Mann | |
| 2005/0205719 A1 | 9/2005 | Hendrickson et al. | |
| 2005/0251299 A1 | 11/2005 | Donnelly et al. | |
| 2005/0288832 A1 | 12/2005 | Smith et al. | |
| 2006/0041341 A1 | 2/2006 | Kane et al. | |
| 2006/0047379 A1 | 3/2006 | Schullian et al. | |
| 2006/0060345 A1 | 3/2006 | Flik et al. | |
| 2006/0085103 A1 | 4/2006 | Smith, Jr. et al. | |
| 2006/0085363 A1 | 4/2006 | Cheng et al. | |
| 2006/0116789 A1 | 6/2006 | Subramanian et al. | |
| 2006/0116795 A1 | 6/2006 | Abe et al. | |
| 2006/0122737 A1 | 6/2006 | Tani et al. | |
| 2006/0155434 A1 | 7/2006 | Kane et al. | |
| 2006/0162973 A1 | 7/2006 | Harris et al. | |
| 2006/0212188 A1 * | 9/2006 | Kickbusch et al. | 701/19 |
| 2006/0277906 A1 | 12/2006 | Burk et al. | |
| 2006/0282199 A1 | 12/2006 | Daum et al. | |
| 2007/0061053 A1 | 3/2007 | Zeitzew | |
| 2007/0112475 A1 | 5/2007 | Koebler et al. | |
| 2007/0219681 A1 | 9/2007 | Kumar et al. | |
| 2007/0219683 A1 | 9/2007 | Daum et al. | |
| 2007/0233364 A1 | 10/2007 | Kumar | |
| 2007/0260369 A1 | 11/2007 | Philp et al. | |
| 2007/0261648 A1 | 11/2007 | Reckels et al. | |
| 2008/0004721 A1 | 1/2008 | Huff et al. | |
| 2008/0128563 A1 | 6/2008 | Kumar et al. | |
| 2008/0147256 A1 | 6/2008 | Liberatore | |
| 2008/0208393 A1 | 8/2008 | Schricker | |
| 2009/0140574 A1 | 6/2009 | Gorman et al. | |
| 2009/0177345 A1 | 7/2009 | Severinsky et al. | |
| 2009/0254239 A1 | 10/2009 | Daum et al. | |
| 2009/0319092 A1 | 12/2009 | Piche | |
| 2010/0152998 A1 | 6/2010 | Schwarzmann | |

FOREIGN PATENT DOCUMENTS

| | | |
|---|---|---|
| DE | 19726542 | 11/1998 |
| DE | 198 30 353 | 2/2001 |
| DE | 199 35 349 | 2/2001 |
| DE | 199 35 353 | 2/2001 |
| DE | 19935353 | 2/2001 |
| DE | 100 45 921 | 3/2002 |
| EP | 0 594 226 | 9/1990 |
| EP | 0 428 113 | 11/1990 |
| EP | 1 136 969 | 7/2002 |
| EP | 1 466 803 | 10/2004 |
| EP | 1 253 059 | 8/2006 |
| FR | 2 129 215 | 10/1972 |
| FR | 2 558 806 | 1/1984 |
| FR | 2 767 770 | 9/1997 |
| FR | 2767770 | 3/1999 |
| GB | 482 625 | 12/1936 |
| JP | 60 028153 | 2/1985 |
| JP | 50-32733 | 9/1993 |
| JP | 06-108869 | 4/1994 |
| JP | 2001-065360 | 3/2001 |
| WO | WO 95/25053 | 9/1995 |
| WO | WO 99/14093 | 3/1999 |

| WO | WO 03/097424 | 11/2003 |
| WO | WO 2004/023517 | 3/2004 |
| WO | WO 2004/051699 | 6/2004 |
| WO | WO 2004/051700 | 6/2004 |
| WO | WO 2004/052755 | 6/2004 |
| WO | WO 2004/059446 | 7/2004 |
| WO | WO 2005/061300 | 3/2007 |
| WO | WO 2007/027130 | 3/2007 |
| WO | WO 2007/091270 | 8/2007 |

OTHER PUBLICATIONS

ISR and WO pertaining to International application No. PCT/US2009/032933 dated Nov. 3, 2009.

Chang et al. "Cycle Detection in Repair-Based Railway Scheduling System", Robotics and Automation, 1996 pp. 2517-2522, V3, New York, NY.

Grabs, Ulrike, "Modification of Electronic Interlocking El S in Service", Signal + Draht, Telzlaff Verlag GmbH, 1995, pp. 254-258, V87(7/08), Darmstadt, DE.

Cheng, Yu, "Hybrid Simulation for Resolving Resource conflicts in Train Traffic Rescheduling", Computers in Industry, 1998, pp. 233-246, V35(3), Amsterdam, NL.

ISR and WO pertaining to International application No. PCT US2006/032893 dated Aug. 24, 2006.

ISR and WO pertaining to International application No. PCT/US2007/001428 dated Jan. 18, 2007.

ISR and WO pertaining to International application No. PCT/US2007/066697 dated Apr. 16, 2007.

ISR and WO pertaining to International application No. PCT/US2007/076699 dated Aug. 24, 2007.

ISR and WO pertaining to International application No. PCT/US2007/078001 dated Sep. 10, 2007.

ISR and WO pertaining to International application No. PCT/US2007/078016 dated Sep. 10, 2007.

ISR and WO pertaining to International application No. PCT/US2007/078118 dated Sep. 11, 2007.

ISR and WO pertaining to International application No. PCT/US2007/078340 dated Sep. 13, 2007.

ISR and WO pertaining to International application No. PCT/US2008/063193 dated May 9, 2008.

ISR and WO pertaining to International application No. PCT/US2008/083526 dated Nov. 14, 2008.

ISR and WO pertaining to International application No. PCT/US2009/031740 dated Jan. 23, 2009.

ISR and WO pertaining to International application No. PCT/US2009/032933 dated Feb. 3, 2009.

ISR and WO pertaining to International application No. PCT/US2009/037293 dated Mar. 16, 2009.

ISR and WO pertaining to International application No. PCT/US2009/045004 dated May 22, 2009.

ISR pertaining to International application No. PCT/US2010/035058 dated May 17, 2010.

ISR pertaining to International application No. PCT/US2010/047251 dated Aug. 31, 2010.

* cited by examiner

METHOD AND APPARATUS FOR OPTIMIZING A TRAIN TRIP USING SIGNAL INFORMATION

STATEMENT REGARDING FEDERALLY SPONSORED RESEARCH OR DEVELOPMENT

This invention was made with government support under contract DE-FC04-2002AL68284 awarded by the U.S. Department of Energy. The government has certain rights in the invention.

CROSS-REFERENCE TO RELATED APPLICATIONS

This application is a continuation-in-part application claiming the benefit of U.S. patent application entitled Trip Optimization System and Method for a Train, filed on Mar. 20, 2006 and assigned application Ser. No. 11/385,354, which is hereby incorporated by reference.

FIELD OF THE INVENTION

The embodiments of the invention relate to optimizing train operations, and more particularly to using track and switch signals in conjunction with monitoring and controlling train operations to improve efficiency while satisfying schedule constraints.

BACKGROUND OF THE INVENTION

A locomotive is a complex system with numerous subsystems, each subsystem interdependent on other subsystems. An operator aboard a locomotive applies tractive and braking effort to control the speed of the locomotive and its load of railcars to assure safe and timely arrival at the desired destination. Speed control must also be exercised to maintain in-train forces within acceptable limits, thereby avoiding excessive coupler forces and the possibility of a train break. To perform this function and comply with prescribed operating speeds that may vary with the train's location on the track, the operator generally must have extensive experience operating the locomotive over the specified terrain with various railcar consists, i.e., different types and number of railcars.

However, even with sufficient knowledge and experience to assure safe operation, the operator generally cannot operate the locomotive to minimize fuel consumption (or other operating characteristics, e.g., emissions) during a trip. Multiple operating factors affect fuel consumption, including, for example, emission limits, locomotive fuel/emissions characteristics, size and loading of railcars, weather, traffic conditions and locomotive operating parameters. An operator can more effectively and efficiently operate a train (through the application of tractive and braking efforts) if provided control information that optimizes performance during a trip while meeting a required schedule (arrival time) and using a minimal amount of fuel (or optimizing another operating parameter), despite the many variables that affect performance. Thus it is desired for the operator to operate the train under the guidance (or control) of an apparatus or process that advises the application of tractive and braking efforts to optimize one or more operating parameters.

BRIEF DESCRIPTION OF THE INVENTION

According to one embodiment, the present invention includes a system for operating a railway network comprising a first railway vehicle during a trip along track segments. The system comprises a first element for determining travel parameters of the first railway vehicle, a second element for determining travel parameters of a second railway vehicle relative to the track segments to be traversed by the first vehicle during the trip, a processor for receiving information from the first and the second elements and for determining a relationship between occupation of a track segment by the second vehicle and later occupation of the same track segment by the first vehicle and an algorithm embodied within the processor having access to the information to create a trip plan that determines a speed trajectory for the first vehicle, wherein the speed trajectory is responsive to the relationship and further in accordance with one or more operational criteria for the first vehicle.

According to another embodiment, the invention includes a method for operating a railway vehicle during a trip along track segments of a rail network. The method comprising determining travel parameters of the vehicle, determining travel parameters of other vehicles traversing the network and executing an algorithm responsive to the travel parameters of the vehicle and the travel parameters of the other vehicles to optimize performance of the vehicle in accordance with one or more operational criteria for the vehicle.

Yet another embodiment includes a computer software code for operating a railway vehicle during a trip along track segments of a rail network. The software code comprises a software module for determining travel parameters of the vehicle, a software module for determining travel parameters of other vehicles traversing the network and a software module for executing an algorithm responsive to the travel parameters of the vehicle and the travel parameters of the other vehicles to optimize performance of the vehicle in accordance with one or more operational criteria for the vehicle.

BRIEF DESCRIPTION OF THE DRAWINGS

A more particular description of the aspects of the inventions described herein will be rendered by reference to specific embodiments thereof that are illustrated in the appended drawings. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION OF THE INVENTION

Figure 1:
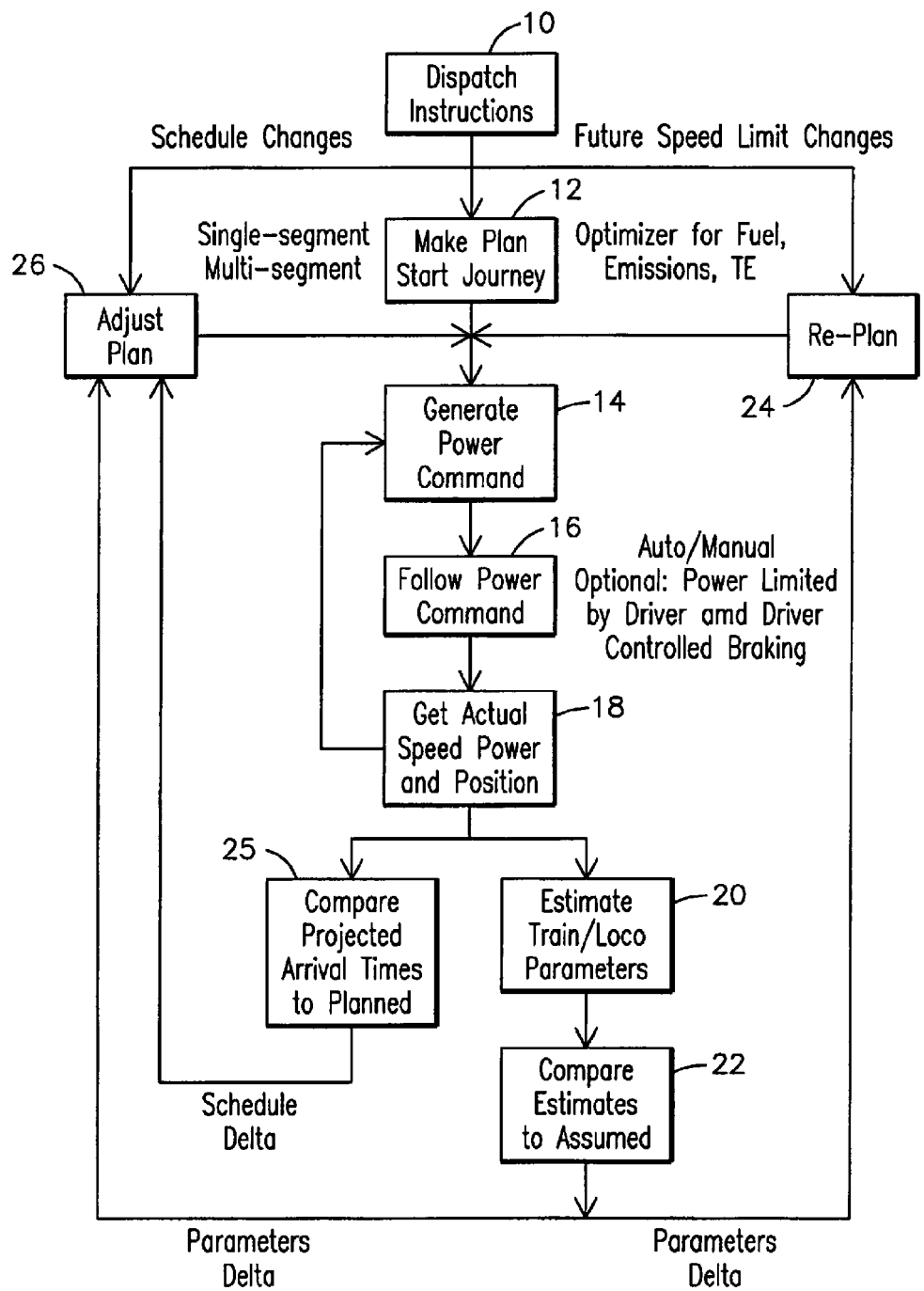
FIG. 1 depicts an exemplary illustration of a flow chart of one embodiment of the present inventions.

Reference will now be made in detail to the embodiments consistent with the aspects of the invention, examples of which are illustrated in the accompanying drawings. Wherever possible, the same reference numerals used throughout the drawings refer to the same or like parts.

The embodiments of the present invention attempt overcome certain disadvantages in the art by providing a system, method, and computer implemented method for determining and implementing a driving strategy of a train including a locomotive consist and a plurality of railcars, by monitoring and controlling (either directly or through suggested operator actions) a train's operations to improve certain objective operating parameters while satisfying schedule and speed constraints. The present inventions are also applicable to a train including a plurality of locomotive consists spaced apart from the lead locomotive consist and controllable by the train operator (referred to as a distributed power train).

Persons skilled in the art will recognize that an apparatus, such as a data processing system, including a CPU, memory, I/O, program storage, a connecting bus, and other appropriate components, could be programmed or otherwise designed to facilitate the practice of the method embodiments of the invention. Such a system would include appropriate program means for executing the methods of these embodiments.

In another embodiment, an article of manufacture, such as a pre-recorded disk or other similar computer program product, for use with a data processing system, includes a storage medium and a program recorded thereon for directing the data processing system to facilitate the practice of the methods of the inventions. Such apparatus and articles of manufacture also fall within the spirit and scope of the inventions.

Broadly speaking, aspects of the invention teach a method, apparatus, and program for determining and implementing a driving strategy of a train to improve certain objective operating parameters while satisfying schedule and speed constraints. To facilitate an understanding of the present inventions, it is described hereinafter with reference to specific implementations thereof.

The inventions are described in the general context of computer-executable instructions, such as program modules, executed by a computer. Generally, program modules include routines, programs, objects, components, data structures, etc. that perform particular tasks or implement particular abstract data types. For example, the software programs that underlie the inventions can be coded in different languages, for use with different processing platforms. In the description that follows, examples of the invention are described in the context of a web portal that employs a web browser. It will be appreciated, however, that the principles that underlie the invention can be implemented with other types of computer software technologies as well.

Moreover, those skilled in the art will appreciate that the invention embodiments may be practiced with other computer system configurations, including hand-held devices, multiprocessor systems, microprocessor-based or programmable consumer electronics, minicomputers, mainframe computers, and the like. The embodiments may also be practiced in a distributed computing environment where tasks are performed by remote processing devices that are linked through a communications network. In the distributed computing environment, program modules may be located in both local and remote computer storage media including memory storage devices. These local and remote computing environments may be contained entirely within the locomotive, or within adjacent locomotives in consist or off-board in wayside or central offices where wireless communications are provided between the computing environments.

The term locomotive consist means one or more locomotives in succession, connected together so as to provide motoring and/or braking capability with no railcars between the locomotives. A train may comprise one or more locomotive consists. Specifically, there may be a lead consist and one or more remote consists, such as a first remote consist midway along the line of railcars and another remote consist at an end of train position. Each locomotive consist may have a first or lead locomotive and one or more trailing locomotives. Though a consist is usually considered as connected successive locomotives, those skilled in the art will readily recognize that a group of locomotives may also be recognized as a consist even with at least one railcar separating the locomotives, such as when the consist is configured for distributed power operation, wherein throttle and braking commands are relayed from the lead locomotive to the remote trails by a radio link or physical cable. Towards this end, the term locomotive consist should be not be considered a limiting factor when discussing multiple locomotives within the same train.

Referring now to the drawings, embodiments of the embodiments of the present invention will be described. The invention embodiments can be implemented in numerous ways, including as a system (including a computer processing system), a method (including a computerized method), an apparatus, a computer readable medium, a computer program product, a graphical user interface, including a web portal or a data structure tangibly fixed in a computer readable memory. Several embodiments of the invention are discussed below.

FIG. 1 depicts an illustration of an exemplary flow chart of the present invention. As illustrated, instructions are input specific to planning a trip either on board or from a remote location, such as a dispatch center 10. Such input information includes, but is not limited to, train position, consist composition (such as locomotive models), locomotive tractive power performance of locomotive traction transmission, consumption of engine fuel as a function of output power, cooling characteristics, intended trip route (effective track grade and curvature as function of milepost or an "effective grade" component to reflect curvature, following standard railroad practices), car makeup and loading (including effective drag coefficients), desired trip parameters including, but not limited to, start time and location, end location, travel time, crew (user and/or operator) identification, crew shift expiration time and trip route.

This data may be provided to the locomotive 42 according to various techniques and processes, such as, but not limited to, manual operator entry into the locomotive 42 via an onboard display, linking to a data storage device such as a hard card, hard drive and/or USB drive or transmitting the information via a wireless communications channel from a central or wayside location 41, such as a track signaling device and/or a wayside device, to the locomotive 42. Locomotive 42 and train 31 load characteristics (e.g., drag) may also change over the route (e.g., with altitude, ambient temperature and condition of the rails and rail-cars), causing a plan update to reflect such changes according to any of the methods discussed above. The updated data that affects the trip optimization process can be supplied by any of the methods and techniques described above and/or by real-time autonomous collection of locomotive/train conditions. Such updates include, for example, changes in locomotive or train characteristics detected by monitoring equipment on or off board the locomotive(s) 42.

A track signal system indicates certain track conditions and provides instructions to the operator of a train approaching the signal. The signaling system, which is described in greater detail below, indicates, for example, an allowable train speed over a segment of track and provides stop and run instructions to the train operator. Details of the signal system, including the location of the signals and the rules associated with different signals are stored in the onboard database 63.

Based on the specification data input into the embodiments of the present invention, an optimal trip plan that minimizes fuel use and/or generated emissions subject to speed limit constraints and a desired start and end time is computed to produce a trip profile 12. The profile contains the optimal speed and power (notch) settings for the train to follow, expressed as a function of distance and/or time from the beginning of the trip, train operating limits, including but not limited to, the maximum notch power and brake settings, speed limits as a function of location and the expected fuel used and emissions generated. In an exemplary embodiment, the value for the notch setting is selected to obtain throttle change decisions about once every 10 to 30 seconds. Those skilled in the art will readily recognize that the throttle change decisions may occur at a longer or shorter intervals, if needed and/or desired to follow an optimal speed profile. In a broader sense, it should be evident to ones skilled in the art that the profiles provide power settings for the train, either at the train level, consist level and/or individual locomotive level. As used herein, power comprises braking power, motoring power and airbrake power. In another preferred embodiment, instead of operating at the traditional discrete notch power settings, the present invention determines a desired power setting, from a continuous range of power settings, to optimize the speed profile. Thus, for example, if an optimal profile specifies a notch setting of 6.8, instead of a notch setting of 7, the locomotive 42 operates at 6.8. Allowing such intermediate power settings may provide additional efficiency benefits as described below.

The procedure for computing the optimal profile can include any number of methods for computing a power sequence that drives the train 31 to minimize fuel and/or emissions subject to locomotive operating and schedule constraints, as summarized below. In some situations the optimal profile may be sufficiently similar to a previously determined profile due to the similarity of train configurations, route and environmental conditions. In these cases it may be sufficient to retrieve the previously-determined driving trajectory from the database 63 and operate the train accordingly.

When a previous plan is not available, methods to compute a new plan include, but are not limited to, direct calculation of the optimal profile using differential equation models that approximate train physics of motion. According to this process, a quantitative objective function is determined, commonly the function comprises a weighted sum (integral) of model variables that correspond to a fuel consumption rate and emissions generated plus a term to penalize excessive throttle variations.

An optimal control formulation is established to minimize the quantitative objective function subject to constraints including but not limited to, speed limits and minimum and maximum power (throttle) settings. Depending on planning objectives at any time, the problem may be setup to minimize fuel subject to constraints on emissions and speed limits or to minimize emissions subject to constraints on fuel use and arrival time. It is also possible to setup, for example, a goal to minimize the total travel time without constraints on total emissions or fuel use where such relaxation of constraints is permitted or required for the mission.

Throughout the document, exemplary equations and objective functions are presented for minimizing locomotive fuel consumption. These equations and functions are for illustration only as other equations and objective functions can be employed to optimize fuel consumption or to optimize other locomotive/train operating parameters according to different objective functions.

Mathematically, the problem to be solved may be stated more precisely. The basic physics are expressed by:

$$\frac{dx}{dt} = v; x(0) = 0.0; x(T_f) = D$$

$$\frac{dv}{dt} = T_e(u, v) - G_a(x) - R(v); v(0) = 0.0; v(T_f) = 0.0$$

where x is the position of the train, v is train velocity, t is time (in miles, miles per hour and minutes or hours as appropriate) and u is the notch (throttle) command input. Further, D denotes the distance to be traveled, $T_f$ the desired arrival time at distance D along the track, $T_e$ is the tractive effort produced by the locomotive consist, $G_a$ is the gravitational drag (which depends on train length, train makeup and travel terrain) and R is the net speed dependent drag of the locomotive consist and train combination. The initial and final speeds can also be specified, but without loss of generality are taken to be zero here (train stopped at beginning and end of the trip). The model is readily modified to include other dynamics factors such the lag between a change in throttle u and a resulting tractive or braking effort.

All these performance measures can be expressed as a linear combination of any of the following:

1. $\min_{u(t)} \int_0^{T_f} F(u(t)) dt$ -Minimize total fuel consumption

2. $\min_{u(t)} T_f$ -Minimize Travel Time

3. $\min_{u_i} \sum_{i=2}^{n_d} (u_i - u_{i-1})^2$ -Minimize notch jockeying (piecewise constant input)

4. $\min_{u(t)} \int_0^{T_f} \left(\frac{du}{dt}\right)^2 dt$ -Minimize notch jockeying (continuous input)

5. Replace the fuel term F(·) in (1) with a term corresponding to emissions production.

A commonly used and representative objective function is thus $$\min_{u(t)} \alpha_1 \int_0^{T_f} F(u(t)) dt + \alpha_3 T_f + \alpha_2 \int_0^{T_f} \left(\frac{du}{dt}\right)^2 dt \quad (OP)$$

The coefficients of the linear combination depend on the importance (weight) given to each of the terms. Note that in equation (OP), u(t) is the optimizing variable that is the continuous notch position. If discrete notch is required, e.g. for older locomotives, the solution to equation (OP) is discretized, which may result in lower fuel savings. Finding a minimum time solution ($\alpha_1$ set to zero and $\alpha_2$ set to zero or a relatively small value) is used to find a lower bound for the achievable travel time ($T_f = T_{fmin}$). In this case, both u(t) and $T_f$ are optimizing variables. The preferred embodiment solves the equation (OP) for various values of $T_f$ with $T_f > T_{fmin}$ with $\alpha_3$ set to zero. In this latter case, $T_f$ is treated as a constraint.

For those familiar with solutions to such optimal problems, it may be necessary to adjoin constraints, e.g. the speed limits along the path:

$$0 \leq v \leq SL(x)$$

or when using minimum time as the objective, the adjoin constraint may be that an end point constraint must hold, e.g. total fuel consumed must be less than what is in the tank, e.g. via:

$$0 < \int_0^{T_f} F(u(t)) dt \leq W_F$$

where $W_F$ is the fuel remaining in the tank at $T_f$. Those skilled in the art will readily recognize that equation (OP) can presented in other forms and that the version above is an exemplary equation for use in one embodiment of the present invention.

Reference to emissions in the context of the present invention is generally directed to cumulative emissions produced in the form of oxides of nitrogen (NOx), unburned hydrocarbons and particulates. By design, every locomotive must be compliant with EPA emission standards, and thus in an embodiment of the present invention that optimizes emissions this may refer to mission-total emissions, for which there is no current EPA specification. Operation of the locomotive according to the optimized trip plan is at all times compliant with EPA emission standards.

If a key objective during a trip is to reduce emissions, the optimal control formulation, equation (OP), is amended to consider this trip objective. A key flexibility in the optimization process is that any or all of the trip objectives can vary by geographic region or mission. For example, for a high priority train, minimum time may be the only objective on one route because of the train's priority. In another example emission output could vary from state to state along the planned train route.

To solve the resulting optimization problem, in an exemplary embodiment the present invention transcribes a dynamic optimal control problem in the time domain to an equivalent static mathematical programming problem with N decision variables, where the number 'N' depends on the frequency at which throttle and braking adjustments are made and the duration of the trip. For typical problems, this N can be in the thousands. In an exemplary embodiment a train is traveling a 172-mile stretch of track in the southwest United States. Utilizing the present invention, an exemplary 7.6% fuel consumption may be realized when comparing a trip determined and followed according to the aspects of the present invention versus a trip where the throttle/speed is determined by the operator according to standard practices. The improved savings is realized because the optimization provided by the present inventions produce a driving strategy with both less drag loss and little or no braking loss compared to the operator controlled trip.

Figure 2:
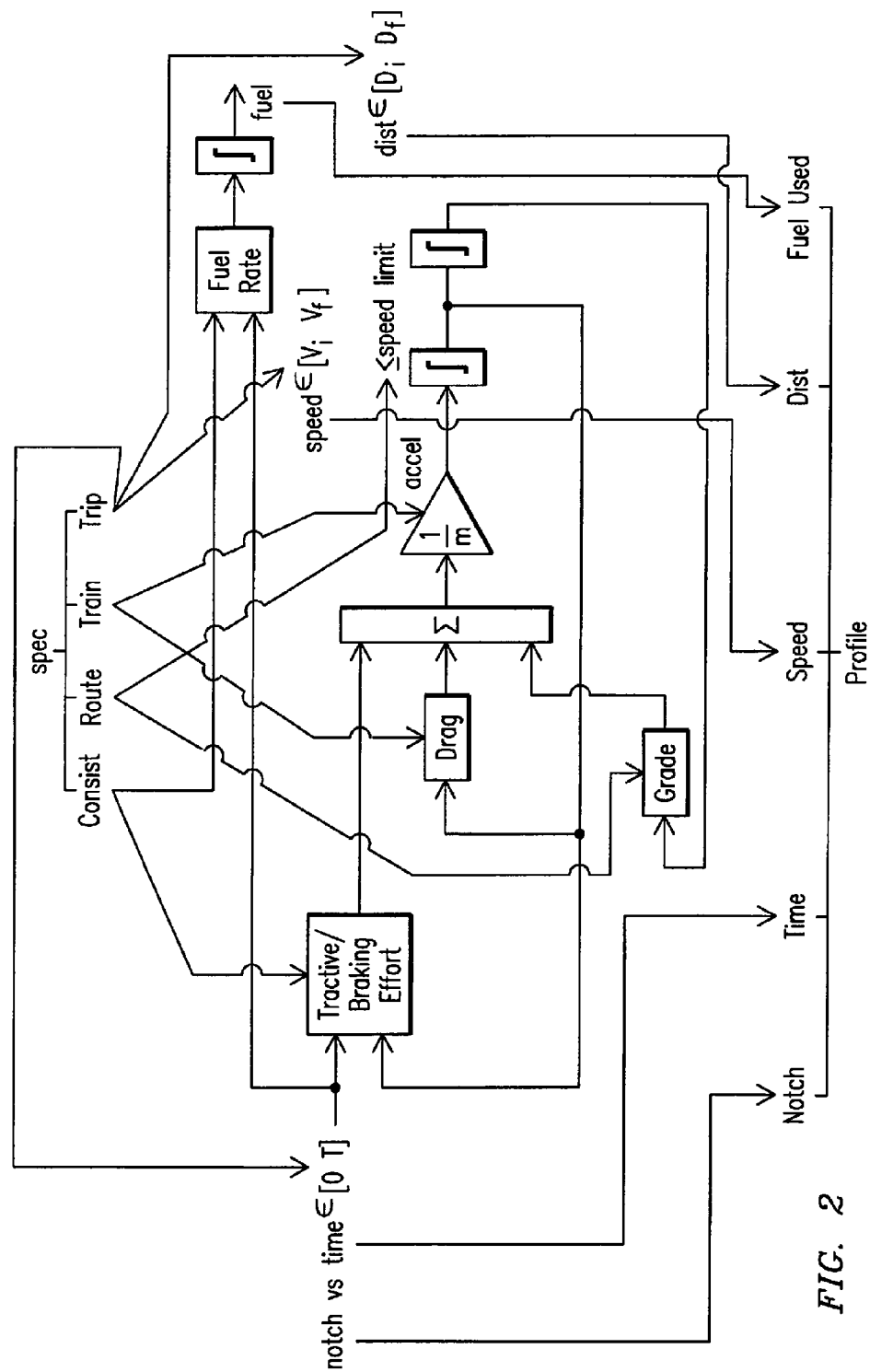
FIG. 2 depicts a simplified model of the train that may be employed.

To make the optimization described above computationally tractable, a simplified model of the train may be employed, such as illustrated in FIG. 2 and set forth in the equations discussed above. A key refinement to the optimal profile is produced by deriving a more detailed model with the optimal power sequence generated, to test if any thermal, electrical and mechanical constraints are violated, leading to a modified profile with speed versus distance that is closest to a run that can be achieved without damaging the locomotive or train equipment, i.e. satisfying additional implied constraints such thermal and electrical limits on the locomotive and in-train forces.

Referring back to FIG. 1, once the trip is started 12, power commands are generated 14 to start the plan. Depending on the operational set-up of the embodiments of the present invention, one command causes the locomotive to follow the optimized power command 16 so as to achieve optimal speed. One embodiment obtains actual speed and power information from the locomotive consist of the train 18. Due to the common approximations in the models used for the optimization, a closed-loop calculation of corrections to the optimized power is obtained to track the desired optimal speed. Such corrections of train operating limits can be made automatically or by the operator, who always has ultimate control of the train.

In some cases, the model used in the optimization may differ significantly from the actual train. This can occur for many reasons, including but not limited to, extra cargo pick-ups or setouts, locomotives that fail in-route, errors in the initial database 63 and data entry errors by the operator. For these reasons, a monitoring system uses real-time train data to estimate locomotive and/or train parameters in real time 20. The estimated parameters are then compared to the assumed parameters when the trip was initially created 22. Based on any differences in the assumed and estimated values, the trip may be re-planned 24. Typically the trip is re-planned if significant savings can be realized from a new plan.

Other reasons a trip may be re-planned include directives from a remote location, such as dispatch, and/or an operator request of a change in objectives to be consistent with global movement planning objectives. Such global movement planning objectives may include, but are not limited to, other train schedules, time required to dissipate exhaust from a tunnel, maintenance operations, etc. Another reason may be due to an onboard failure of a component. Strategies for re-planning may be grouped into incremental and major adjustments depending on the severity of the disruption, as discussed in more detail below. In general, a "new" plan must be derived from a solution to the optimization problem equation (OP) described above, but frequently faster approximate solutions can be found, as described herein.

Figure 4:
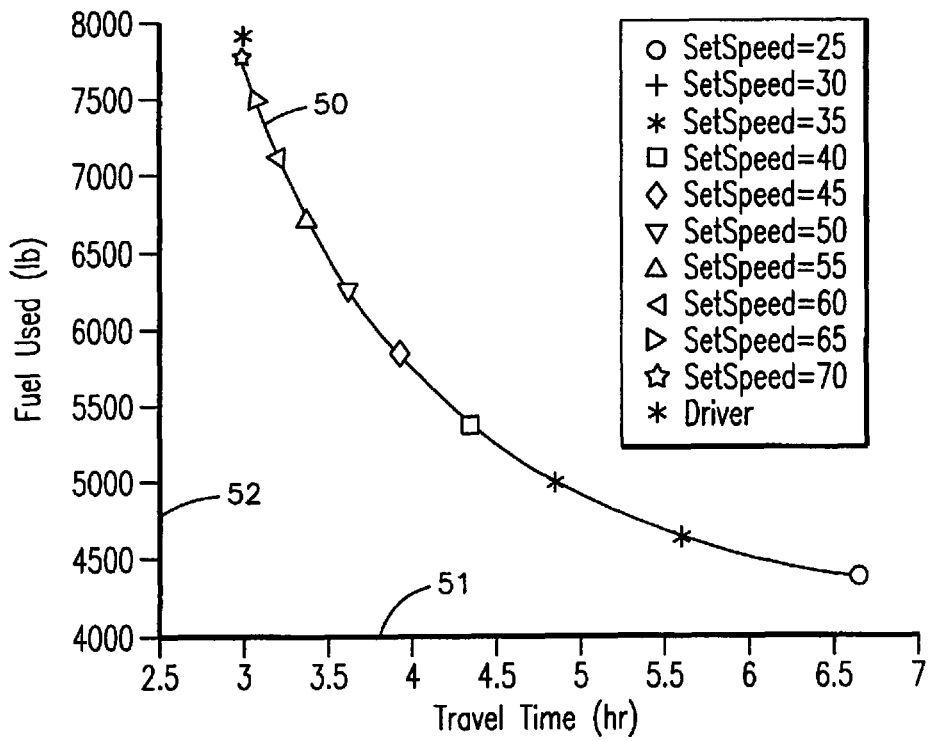
FIG. 4 depicts an exemplary embodiment of a fuel-use/travel time curve.

In operation, the locomotive 42 will continuously monitor system efficiency and continuously update the trip plan based on the actual measured efficiency whenever such an update may improve trip performance. Re-planning computations may be carried out entirely within the locomotive(s) or fully or partially performed at a remote location, such as dispatch or wayside processing facilities where wireless technology can communicate the new plan to the locomotive 42. One embodiment of the present invention may also generate efficiency trends for developing locomotive fleet data regarding efficiency transfer functions. The fleet-wide data may be used when determining the initial trip plan, and may be used for network-wide optimization tradeoff when considering locations of a plurality of trains. For example, the travel-time fuel-use tradeoff curve as illustrated in FIG. 4 reflects a capability of a train on a particular route at a current time, updated from ensemble averages collected for many similar trains on the same route. Thus, a central dispatch facility collecting curves like FIG. 4 from many locomotives could use that information to better coordinate overall train movements to achieve a system-wide advantage in fuel use or throughput.

Many events during daily operations may motivate the generation of a new or modified plan, including a new or modified trip plan that retains the same trip objectives, for example, when a train is not on schedule for a planned meet or pass with another train and therefore must make up the lost time. Using the actual speed, power and location of the locomotive, a planned arrival time is compared with a currently estimated (predicted) arrival time 25. Based on a difference in the times, as well as the difference in parameters (detected or changed by dispatch or the operator) the plan is adjusted 26. This adjustment may be made automatically responsive to a railroad company's policy for handling departures from plan or manually as the on-board operator and dispatcher jointly decide the best approach for returning the plan. Whenever a plan is updated but where the original objectives, such as but not limited to arrival time remain the same, additional changes may be factored in concurrently, e.g. new future speed limit changes, which could affect the feasibility of recovering the original plan. In such instances if the original trip plan cannot be maintained, or in other words the train is unable to meet the original trip plan objectives, as discussed herein other trip plan(s) may be presented to the operator, remote facility and/or dispatch.

A re-plan may also be made when it is desired to change the original objectives. Such re-planning can be done at either fixed preplanned times, manually at the discretion of the operator or dispatcher or autonomously when predefined limits, such a train operating limits, are exceeded. For example, if the current plan execution is running late by more than a specified threshold, such as thirty minutes, one embodiment of the present invention can re-plan the trip to accommodate the delay at the expense of increased fuel consumption as described above or to alert the operator and dispatcher as to the extent to which lost time can be regained, if at all (i.e., what is the minimum time remaining or the maximum fuel that can be saved within a time constraint). Other triggers for re-plan can also be envisioned based on fuel consumed or the health of the power consist, including but not limited time of arrival, loss of horsepower due to equipment failure and/or equipment temporary malfunction (such as operating too hot or too cold), and/or detection of gross setup errors, such in the assumed train load. That is, if the change reflects impairment in the locomotive performance for the current trip, these may be factored into the models and/or equations used in the optimization process.

Changes in plan objectives can also arise from a need to coordinate events where the plan for one train compromises the ability of another train to meet objectives and arbitration at a different level, e.g. the dispatch office, is required. For example, the coordination of meets and passes may be further optimized through train-to-train communications. Thus, as an example, if an operator knows he is behind schedule in reaching a location for a meet and/or pass, communications from the other train can advise the operator of the late train (and/or dispatch). The operator can enter information pertaining to the expected late arrival for recalculating the train's trip plan. In one embodiment the present invention is used at a high level or network-level, to allow a dispatch to determine which train should slow down or speed up should it appear that a scheduled meet and/or pass time constraint may not be met. As discussed herein, this is accomplished by trains transmitting data to dispatch to prioritize how each train should change its planning objective. A choice can be made either based on schedule or fuel saving benefits, depending on the situation.

For any of the manually or automatically initiated re-plans, the embodiment of the present invention may present more than one trip plan to the operator. In an exemplary embodiment, the present invention presents different profiles to the operator, allowing the operator to select the arrival time and also understand the corresponding fuel and/or emission impact. Such information can also be provided to the dispatch for similar considerations, either as a simple list of alternatives or as a plurality of tradeoff curves such as illustrated in FIG. 4.

In one embodiment the present invention includes the ability to learn and adapt to key changes in the train and power consist that can be incorporated either in the current plan and/or for future plans. For example, one of the triggers discussed above is loss of horsepower. When building up horsepower over time, either after a loss of horsepower or when beginning a trip, transition logic is utilized to determine when a desired horsepower is achieved. This information can be saved in the locomotive database 61 for use in optimizing either future trips or the current trip should loss of horsepower occur again later.

Figure 3:
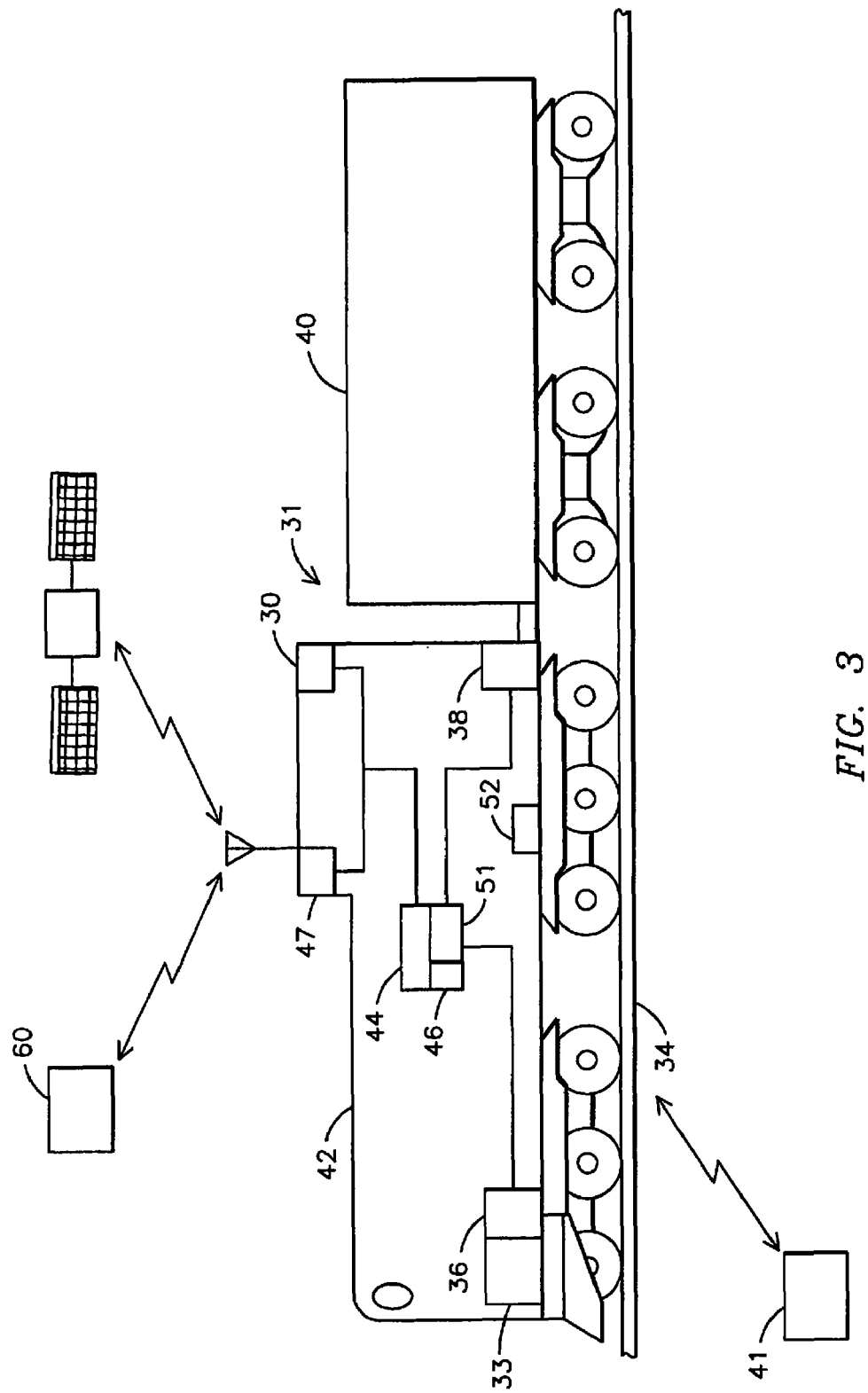
FIG. 3 depicts an exemplary embodiment of elements of the present invention.

FIG. 3 depicts an exemplary embodiment of elements of the present invention. A locator element 30 determines a location of the train 31. The locator element 30 comprises a GPS sensor or a system of sensors that determine a location of the train 31. Examples of such other systems may include, but are not limited to, wayside devices, such as radio frequency automatic equipment identification (RF AEI) tags, dispatch, and/or video-based determinations. Another system may use tachometer(s) aboard a locomotive and distance calculations from a reference point. As discussed previously, a wireless communication system 47 may also be provided to allow communications between trains and/or with a remote location, such as dispatch. Information about travel locations may also be transferred from other trains over the communications system.

A track characterization element 33 provides information about a track, principally grade, elevation and curvature information. The track characterization element 33 may include an on-board track integrity database 36. Sensors 38 measure a tractive effort 40 applied by the locomotive consist 42, throttle setting of the locomotive consist 42, locomotive consist 42 configuration information, speed of the locomotive consist 42, individual locomotive configuration information, individual locomotive capability, etc. In an exemplary embodiment the locomotive consist 42 configuration information may be loaded without the use of a sensor 38, but is input by other approaches as discussed above. Furthermore, the health of the locomotives in the consist may also be considered. For example, if one locomotive in the consist is unable to operate above power notch level 5 this information is used when optimizing the trip plan.

Information from the locator element may also be used to determine an appropriate arrival time of the train 31. For example, if there is a train 31 moving along a track 34 toward a destination and no train is following behind it, and the train has no fixed arrival deadline to satisfy, the locator element, including but not limited to radio frequency automatic equipment identification (RF AEI) tags, dispatch, and/or video-based determinations, may be used to determine the exact location of the train 31. Furthermore, inputs from these signaling systems may be used to adjust the train speed. Using the on-board track database, discussed below, and the locator element, such as GPS, one embodiment of the invention adjusts the operator interface to reflect the signaling system state at the given locomotive location. In a situation where signal states indicate restrictive speeds ahead, the planner may elect to slow the train to conserve fuel consumption.

Information from the locator element 30 may also be used to change planning objectives as a function of distance to a destination. For example, owing to inevitable uncertainties about congestion along the route, "faster" time objectives on the early part of a route may be employed as hedge against delays that statistically occur later. If on a particular trip such delays do not occur, the objectives on a latter part of the journey can be modified to exploit the built-in slack time that was banked earlier and thereby recover some fuel efficiency. A similar strategy can be invoked with respect to emission-restrictive objectives, e.g. emissions constraints that apply when approaching an urban area.

As an example of the hedging strategy, if a trip is planned from New York to Chicago, the system may provide an option to operate the train slower at either the beginning of the trip, at the middle of the trip or at the end of the trip. One embodiment of the invention optimizes the trip plan to allow for slower operation at the end of the trip since unknown constraints, such as but not limited to weather conditions, track maintenance, etc., may develop and become known during the trip. As another consideration, if traditionally congested areas are known, the plan is developed with an option to increase the driving flexibility around such regions. Therefore, embodiments of the invention may also consider weighting/penalizing as a function of time/distance into the future and/or based on known/past experiences. Those skilled in the art will readily recognize that such planning and re-planning to take into consideration weather conditions, track conditions, other trains on the track, etc., may be considered at any time during the trip wherein the trip plan is adjusted accordingly.

FIG. 3 further discloses other elements that may be part of embodiments of the present invention. A processor 44 operates to receive information from the locator element 30, track characterizing element 33 and sensors 38. An algorithm 46 operates within the processor 44. The algorithm 46 computes an optimized trip plan based on parameters involving the locomotive 42, train 31, track 34, and objectives of the mission as described herein. In an exemplary embodiment the trip plan is established based on models for train behavior as the train 31 moves along the track 34 as a solution of non-linear differential equations derived from applicable physics with simplifying assumptions that are provided in the algorithm. The algorithm 46 has access to the information from the locator element 30, track characterizing element 33 and/or sensors 38 to create a trip plan minimizing fuel consumption of a locomotive consist 42, minimizing emissions of a locomotive consist 42, establishing a desired trip time, and/or ensuring proper crew operating time aboard the locomotive consist 42. In an exemplary embodiment, a driver or controller element, 51 is also provided. As discussed herein, the controller element 51 may control the train as it follows the trip plan. In an exemplary embodiment discussed further herein, the controller element 51 makes train operating decisions autonomously. In another exemplary embodiment, the operator may be involved with directing the train to follow or deviate from the trip plan in his discretion.

In one embodiment of the present invention, the trip plan is modifiable in real time as the plan is being executed. This includes creating the initial plan for a long distance trip, owing to the complexity of the plan optimization algorithm. When a total length of a trip profile exceeds a given distance, an algorithm 46 may be used to segment the mission by dividing the mission into waypoints. Though only a single algorithm 46 is discussed, those skilled in the art will readily recognize that more than one algorithm may be used and that such multiple algorithms are linked to create the trip plan.

The trip waypoints may include natural locations where the train 31 stops, such as, but not limited to, single mainline sidings for a meet with opposing traffic or for a pass with a train behind the current train, a yard siding, an industrial spur where cars are picked up and set out and locations of planned maintenance work. At such waypoints the train 31 may be required to be at the location at a scheduled time, stopped or moving with speed in a specified range. The time duration from arrival to departure at waypoints is called dwell time.

In an exemplary embodiment, the present invention is able to break down a longer trip into smaller segments according to a systematic process. Each segment can be somewhat arbitrary in length, but is typically picked at a natural location such as a stop or significant speed restriction, or at key waypoints or mileposts that define junctions with other routes. Given a partition or segment selected in this way, a driving profile is created for each segment of track as a function of travel time taken as an independent variable, such as shown in FIG. 4. The fuel used/travel-time tradeoff associated with each segment can be computed prior to the train 31 reaching that segment of track. A total trip plan can therefore be created from the driving profiles created for each segment. One embodiment of the invention optimally distributes travel time among all segments of the trip so that the total trip time required is satisfied and total fuel consumed over all the segments is minimized. An exemplary three segment trip is disclosed in FIG. 6 and discussed below. Those skilled in the art will recognize however, though segments are discussed, the trip plan may comprise a single segment representing the complete trip.

FIG. 4 depicts an exemplary embodiment of a fuel-use/travel time curve. As mentioned previously, such a curve 50 is created when calculating an optimal trip profile for various travel times for each segment. That is, for a given travel time 51, fuel used 52 is the result of a detailed driving profile computed as described above. Once travel times for each segment are allocated, a power/speed plan is determined for each segment from the previously computed solutions. If there are any waypoint speed constraints between the segments, such as, but not limited to, a change in a speed limit, they are matched during creation of the optimal trip profile. If speed restrictions change only within a single segment, the fuel use/travel-time curve 50 has to be re-computed for only the segment changed. This process reduces the time required for re-calculating more parts, or segments, of the trip. If the locomotive consist or train changes significantly along the route, e.g. loss of a locomotive or pickup or set-out of railcars, then driving profiles for all subsequent segments must be recomputed creating new instances of the curve 50. These new curves 50 are then used along with new schedule objectives to plan the remaining trip.

Once a trip plan is created as discussed above, a trajectory of speed and power versus distance allows the train to reach a destination with minimum fuel and/or emissions at the required trip time. There are several techniques for executing the trip plan. As provided below in more detail, in one exemplary embodiment of a coaching mode, the present invention displays control information to the operator. The operator follows the information to achieve the required power and speed as determined according to the optimal trip plan. Thus in this mode the operator is provided with operating suggestions for use in driving the train. In another exemplary embodiment, control actions to accelerate the train or maintain a constant speed are performed by the present invention. However, when the train 31 must be slowed, the operator is responsible for applying brakes by controlling a braking system 52. In another exemplary embodiment, the present invention commands power and braking actions as required to follow the desired speed-distance path.

Feedback control strategies are used to correct the power control sequence in the profile to account for such events as, but not limited to, train load variations caused by fluctuating head winds and/or tail winds. Another such error may be caused by an error in train parameters, such as, but not limited to, train mass and/or drag, as compared with assumptions in the optimized trip plan. A third type of error may occur due to incorrect information in the track database 36. Another possible error may involve un-modeled performance differences due to the locomotive engine, traction motor thermal deration and/or other factors. Feedback control strategies compare the actual speed as a function of position with the speed in the desired optimal profile. Based on this difference, a correction to the optimal power profile is added to drive the actual velocity toward the optimal profile. To assure stable regulation, a compensation algorithm may be provided that filters the feedback speeds into power corrections to assure closed-loop performance stability. Compensation may include standard dynamic compensation as used by those skilled in the art of control system design to meet performance objectives.

According to various aspects, the present invention allows the simplest and therefore fastest means to accommodate changes in trip objectives, which is the rule rather than the exception in railroad operations. In an exemplary embodiment, to determine the fuel-optimal trip from point A to point B where there are stops along the way, and for updating the trip for the remainder of the trip once the trip has begun, a sub-optimal decomposition method can be used for finding an optimal trip profile. Using modeling methods, the computation method can find the trip plan with specified travel time and initial and final speeds to satisfy all the speed limits and locomotive capability constraints when there are stops. Though the following discussion is directed to optimizing fuel use, it can also be applied to optimize other factors, such as, but not limited to, emissions, schedule, crew comfort and load impact. The method may be used at the outset in developing a trip plan, and more importantly to adapting to changes in objectives after initiating a trip.

Figure 5:
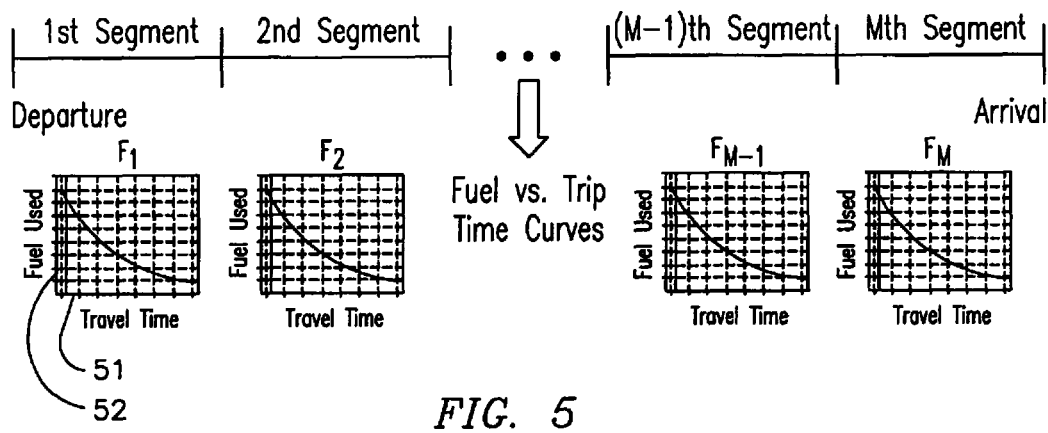
FIG. 5 depicts an exemplary embodiment of segmentation decomposition for trip planning.
Figure 6:
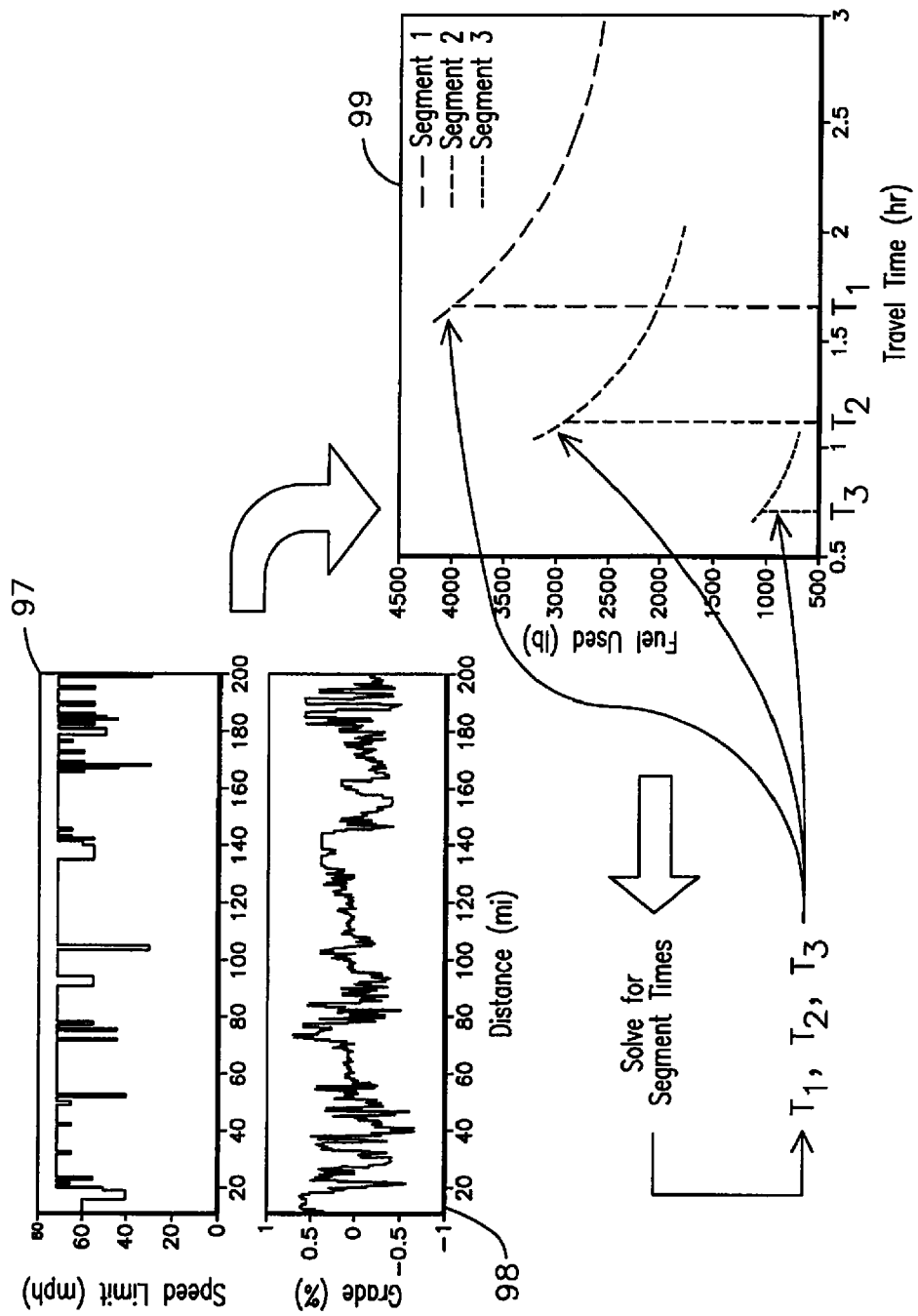
FIG. 6 depicts an exemplary embodiment of a segmentation example.

As discussed herein, one embodiment of the present invention employs a setup as illustrated in the exemplary flow chart depicted in FIG. 5 and as an exemplary three segment example depicted in detail in FIG. 6. As illustrated, the trip may be broken into two or more segments, T1, T2, and T3, though as discussed herein, it is possible to consider the trip as a single segment. As discussed herein, the segment boundaries may not result in equal-length segments. Instead the segments use natural or mission specific boundaries. Optimal trip plans are pre-computed for each segment. If fuel use versus trip time is the trip object to be met, fuel versus trip time curves are generated for each segment. As discussed herein, the curves may be based on other factors wherein the factors are objectives to be met with a trip plan. When trip time is the parameter being determined, trip time for each segment is computed while satisfying the overall trip time constraints.

FIG. 6 illustrates speed limits for an exemplary three segment 200 mile trip 97. Further illustrated are grade changes over the 200 mile trip 98. A combined chart 99 illustrating curves of fuel used for each segment of the trip over the travel time is also shown.

Using the optimal control setup described previously, the present computation method can find the trip plan with specified travel time and initial and final speeds, to satisfy all the speed limits and locomotive capability constraints when there are stops. Though the following detailed discussion is directed to optimizing fuel use, it can also be applied to optimize other factors as discussed herein, such as, but not limited to, emissions. The method can accommodate desired dwell times at stops and considers constraints on earliest arrival and departure at a location as may be required, for example, in single-track operations where the time to enter or pass a siding is critical.

According to one embodiment, the invention finds a fuel-optimal trip from distance $D_0$ to $D_M$, traveled in time T, with $M-1$ intermediate stops at $D_1, \ldots, D_{M-1}$, and with the arrival and departure times at these stops constrained by $$t_{min}(i) \leq t_{arr}(D_i) \leq t_{max}(i) - \Delta t_i$$

$$t_{arr}(D_i) + \Delta t_i \leq t_{dep}(D_i) \leq t_{max}(i) \quad i=1, \ldots, M-1$$

where $t_{arr}(D_i)$, $t_{dep}(D_i)$, and $\Delta t_i$ are the arrival, departure, and minimum stop time at the $i^{th}$ stop, respectively. Assuming that fuel-optimality implies minimizing stop time, therefore $t_{dep}(D_i) = t_{arr}(D_i) + \Delta t_i$ which eliminates the second inequality above. Suppose for each $i=1, \ldots, M$, the fuel-optimal trip from $D_{i-1}$ to $D_i$ for travel time t, $T_{min}(i) \leq t \leq T_{max}(i)$, is known. Let $F_i(t)$ be the fuel-use corresponding to this trip. If the travel time from $D_{j-1}$ to $D_j$ is denoted $T_j$, then the arrival time at $D_i$ is given by $$t_{arr}(D_i) = \sum_{j=1}^{i} (T_j + \Delta t_{j-1})$$

where $\Delta t_0$ is defined to be zero. The fuel-optimal trip from $D_0$ to $D_M$ for travel time T is then obtained by finding $T_i$, $i=1, \ldots, M$, which minimizes $$\sum_{i=1}^{M} F_i(T_i) \quad T_{min}(i) \leq T_i \leq T_{max}(i)$$

subject to $$t_{min}(i) \leq \sum_{j=1}^{i} (T_j + \Delta t_{j-1}) \leq t_{max}(i) - \Delta t_i \quad i=1, \ldots, M-1$$

$$\sum_{j=1}^{M} (T_j + \Delta t_{j-1}) = T$$

Once a trip is underway, the issue is re-determining the fuel-optimal solution for the remainder of the trip (originally from $D_0$ to $D_M$ in time T) as the trip is traveled, but where disturbances preclude following the fuel-optimal solution. Let the current distance and speed be x and v, respectively, where $D_{i-1} < x \leq D_i$. Also, let the current time since the beginning of the trip be $t_{act}$. Then the fuel-optimal solution for the remainder of the trip from x to $D_M$, which retains the original arrival time at $D_M$, is obtained by finding $\tilde{T}_i$, $T_j$, $j=i+1, \ldots M$, which minimizes $$\tilde{F}_i(\tilde{T}_i, x, v) + \sum_{j=i+1}^{M} F_j(T_j)$$

subject to $$t_{min}(i) \leq t_{act} + \tilde{T}_i \leq t_{max}(i) - \Delta t_i$$

-continued $$t_{min}(k) \leq t_{act} + \tilde{T}_i + \sum_{j=i+1}^{k} (T_j + \Delta t_{j-1}) \leq t_{max}(k) - \Delta t_k$$

$$k = i+1, \ldots, M-1$$

$$t_{act} + \tilde{T}_i + \sum_{j=i+1}^{M} (T_j + \Delta t_{j-1}) = T$$

Here, $\tilde{F}_i(t,x,v)$ is the fuel-used of the optimal trip from x to $D_i$, traveled in time t, with initial speed at x of v.

As discussed above, an exemplary process to enable more efficient re-planning constructs the optimal solution for a stop-to-stop trip from partitioned segments. For the trip from $D_{i-1}$ to $D_i$, with travel time $T_i$, choose a set of intermediate points $D_{ij}$, $j=1, \ldots, N_i-1$. Let $D_{i0}=D_{i-1}$ and $D_{iN_i}=D_i$. Then express the fuel-use for the optimal trip from $D_{i-1}$ to $D_i$ as $$F_i(t) = \sum_{j=1}^{N_i} f_{ij}(t_{ij} - t_{i,j-1}, v_{i,j-1}, v_{ij})$$

where $f_{ij}(t, \sigma_{i,j-1}, v_{ij})$ is the fuel-use for the optimal trip from $D_{i,j-1}$ to $D_{ij}$, traveled in time t, with initial and final speeds of $v_{i,j-1}$ and $v_{ij}$. Furthermore, $t_{ij}$ is the time in the optimal trip corresponding to distance $D_{ij}$. By definition, $t_{iN_i} - t_{i0} = T_i$. Since the train is stopped at $D_{i0}$ and $D_{iN_i}$, $v_{i0} = v_{iN_i} = 0$.

The above expression enables the function $F_i(t)$ to be alternatively determined by first determining the functions $f_{ij}(\cdot)$, $1 \leq j \leq N_i$, then finding $\tau_{ij}$, $1 \leq j \leq N_i$ and $v_{ij}$, $1 \leq j \leq N_i$, which minimize $$F_i(t) = \sum_{j=1}^{N_i} f_{ij}(\tau_{ij}, v_{i,j-1}, v_{ij})$$

subject to $$\sum_{j=1}^{N_i} \tau_{ij} = T_i$$

$$v_{min}(i, j) \leq v_{ij} \leq v_{max}(i, j) \quad j = 1, \ldots, N_i - 1$$

$$v_{i0} = v_{iN_i} = 0$$

By choosing $D_{ij}$ (e.g., at speed restrictions or meeting points), $v_{max}(i,j) - v_{min}(i,j)$ can be minimized, thus minimizing the domain over which $f_{ij}(\ )$ needs to be known.

Based on the partitioning described above, a simpler suboptimal re-planning approach than that described above restricts re-planning to times when the train is at distance points $D_{ij}$, $1 \leq i \leq M$, $1 \leq j \leq N_i$. At point $D_{ij}$, the new optimal trip from $D_{ij}$ to $D_M$ can be determined by finding $\tau_{ik}$, $j < k \leq N_i$, $v_{ik}$, $j < k < N_i$ and $\tau_{mn}$, $i < m \leq M$, $1 \leq n \leq N_m$, $v_{mn}$, $i < m \leq M$, $1 \leq n < N_m$, which minimize $$\sum_{k=j+1}^{N_i} f_{ik}(\tau_{ik}, v_{i,k-1}, v_{ik}) + \sum_{m=i+1}^{M} \sum_{n=1}^{N_m} f_{mn}(\tau_{mn}, v_{m,n-1}, v_{mn})$$

subject to $$t_{min}(i) \leq t_{act} + \sum_{k=j+1}^{N_i} \tau_{ik} \leq t_{max}(i) - \Delta t_i$$

$$t_{min}(n) \leq t_{act} + \sum_{k=j+1}^{N_i} \tau_{ik} + \sum_{m=i+1}^{n} (T_m + \Delta t_{m-1}) \leq t_{max}(n) - \Delta t_n$$

$$n = i+1, \ldots, M-1$$

$$t_{act} + \sum_{k=j+1}^{N_i} \tau_{ik} + \sum_{m=i+1}^{M} (T_m + \Delta t_{m-1}) = T$$

where $$T_m = \sum_{n=1}^{N_m} \tau_{mn}$$

A further simplification is obtained by waiting on the re-computation of $T_m$, $i < m \leq M$, until distance point $D_i$ is reached. In this way at points $D_{ij}$ between $D_{i-1}$ and $D_i$, the minimization above needs to be performed only over $\tau_{ik}$, $j < k \leq N_i$, $v_{ik}$, $j < k < N_i$. $T_i$ is increased as needed to accommodate any longer actual travel time from $D_{i-1}$ to $D_{ij}$ than planned. This increase is later compensated, if possible, by the re-computation of $T_m$, $i < m \leq M$, at distance point $D_i$.

With respect to the closed-loop configuration disclosed above, the total input energy required to move a train 31 from point A to point B consists of the sum of four components, specifically difference in kinetic energy between the points A and B; difference in potential energy between the points A and B; energy loss due to friction and other drag losses; and energy dissipated by the application of the brakes. Assuming the start and end speeds are equal (e.g., stationary) the first component is zero. Furthermore, the second component is independent of driving strategy. Thus, it suffices to minimize the sum of the last two components.

Following a constant speed profile minimizes drag loss. Following a constant speed profile also minimizes total energy input when braking is not needed to maintain constant speed. However, if braking is required to maintain constant speed, applying braking just to maintain constant speed will most likely increase total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, the new optimal notch/speed plan can be followed using the closed loop control described herein. However, in some situations there may not be enough time to carry out the segment-decomposed planning described above, and particularly when there are critical speed restrictions that must be respected, an alternative may be preferred. One embodiment of the invention accomplishes this with an algorithm referred to as "smart cruise control". The smart cruise control algorithm is an efficient process for generating, on the fly, an energy-efficient (hence fuel-efficient) sub-optimal prescription for driving the train 31 over a known terrain. This algorithm assumes knowledge of the position of the train 31 along the track 34 at all times, as well as knowledge of the grade and curvature of the track versus position. The method relies on a point-mass model for the motion of the train 31, whose parameters may be adaptively estimated from online measurements of train motion as described earlier.

The smart cruise control algorithm has three principal components, specifically a modified speed limit profile that serves as an energy-efficient guide around speed limit reductions; an ideal throttle or dynamic brake setting profile that attempts to balance minimizing speed variations and braking; and a mechanism for combining the latter two components to produce a notch command, employing a speed feedback loop to compensate for mismatches of modeled parameters when compared to reality parameters. Smart cruise control can accommodate strategies in the embodiments of the invention without active braking (i.e. the driver is signaled and assumed to provide the requisite braking) or a variant that does provide active braking.

With respect to the cruise control algorithm that does not control dynamic braking, the three exemplary components are a modified speed limit profile that serves as an energy-efficient guide around speed limit reductions, a notification signal to notify the operator when braking should be activated, an ideal throttle profile that attempts to balance minimizing speed variations and notifying the operator to apply brakes and a mechanism employing a feedback loop to compensate for mismatches of model parameters to reality parameters.

Also included, according to aspects of the present invention, is an approach to identify key parameter values of the train 31. For example, with respect to estimating train mass, a Kalman filter and a recursive least-squares approach may be utilized to detect errors that may develop over time.

Figure 7:
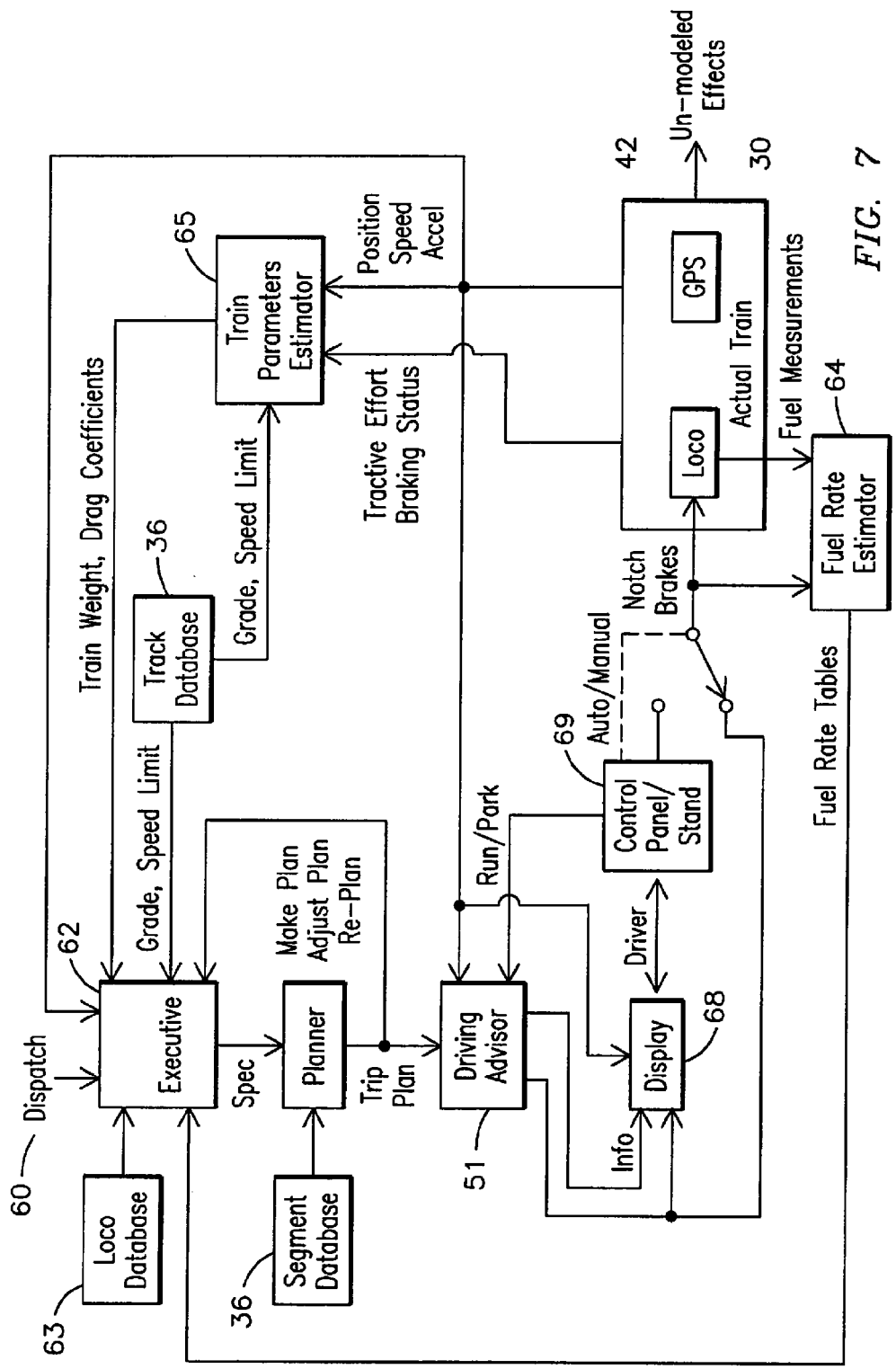
FIG. 7 depicts an exemplary flow chart of one embodiment of the present invention.

FIG. 7 depicts an exemplary flow chart of the present invention. As discussed previously, a remote facility, such as a dispatch center 60 can provide information for use by the present invention. As illustrated, such information is provided to an executive control element 62. Also supplied to the executive control element 62 is a locomotive modeling information database 63, a track information database 36 such as, but not limited to, track grade information and speed limit information, estimated train parameters such as, but not limited to, train weight and drag coefficients, and fuel rate tables from a fuel rate estimator 64. The executive control element 62 supplies information to the planner 12, which is disclosed in more detail in FIG. 1. Once a trip plan has been calculated, the plan is supplied to a driving advisor, driver or controller element 51. The trip plan is also supplied to the executive control element 62 so that it can compare the trip when other new data is provided.

As discussed above, the driving advisor 51 can automatically set a notch power, either a pre-established notch setting or an optimum continuous notch power value. In addition to supplying a speed command to the locomotive 31, a display 68 is provided so that the operator can view what the planner has recommended. The operator also has access to a control panel 69. Through the control panel 69 the operator can decide whether to apply the notch power recommended. Towards this end, the operator may limit a targeted or recommended power. That is, at any time the operator always has final authority over the power setting for operation of the locomotive consist, including whether to apply brakes if the trip plan recommends slowing the train 31. For example, if operating in dark territory, or where information from wayside equipment cannot electronically transmit information to a train and instead the operator views visual signals from the wayside equipment, the operator inputs commands based on information contained in the track database and visual signals from the wayside equipment. Based on how the train 31 is functioning, information regarding fuel measurement is supplied to the fuel rate estimator 64. Since direct measurement of fuel flows is not typically available in a locomotive consist, all information on fuel consumed to a point in the trip and projections into the future if the optimal plans are followed use calibrated physics models, such as those used in developing the optimal plans. For example, such predictions may include, but are not limited to, the use of measured gross horse-power and known fuel characteristics to derive the cumulative fuel used.

The train 31 also has a locator device 30 such as a GPS sensor, as discussed above. Information is supplied to the train parameters estimator 65. Such information may include, but is not limited to, GPS sensor data, tractive/braking effort data, braking status data, speed and any changes in speed data. With information regarding grade and speed limit information, train weight and drag coefficients information is supplied to the executive control element 62.

One embodiment of the present invention may also allow for the use of continuously variable power throughout the optimization planning and closed loop control implementation. In a conventional locomotive, power is typically quantized to eight discrete levels. Modern locomotives can realize continuous variation in horsepower that may be incorporated into the previously described optimization methods. With continuous power, the locomotive 42 can further optimize operating conditions, e.g., by minimizing auxiliary loads and power transmission losses, and fine tuning engine horse-power regions of optimum efficiency or to points of increased emissions margins. Example include, but are not limited to, minimizing cooling system losses, adjusting alternator voltages, adjusting engine speeds, and reducing number of powered axles. Further, the locomotive 42 may use the on-board track database 36 and the forecasted performance requirements to minimize auxiliary loads and power transmission losses to provide optimum efficiency for the target fuel consumption/emissions. Examples include, but are not limited to, reducing a number of powered axles on flat terrain and pre-cooling the locomotive engine prior to entering a tunnel.

One embodiment of the invention may also use the on-board track database 36 and the forecasted performance to adjust the locomotive performance, such as to ensure that the train has sufficient speed as it approaches a hill and/or tunnel. For example, this could be expressed as a speed constraint at a particular location that becomes part of the optimal plan generation created solving the equation (OP). Additionally, an embodiment may incorporate train-handling rules, such as, but not limited to, tractive effort ramp rates and maximum braking effort ramp rates. These may incorporated directly into the formulation for optimum trip profile or alternatively incorporated into the closed loop regulator used to control power application to achieve the target speed.

In a preferred embodiment, the present invention is installed only on a lead locomotive of the train consist. Even though according to certain aspects, the present invention is not dependent on data or interactions with other locomotives, it may be integrated with a consist manager functionality, as disclosed in U.S. Pat. No. 6,691,957 and patent application Ser. No. 10/429,596 (both owned by the Assignee and both incorporated by reference), and/or a consist optimizer functionality to improve efficiency. Interaction with multiple trains is not precluded as illustrated by the example of dispatch arbitrating two "independently optimized" trains described herein.

One embodiment of the present invention may be used with consists in which the locomotives are not contiguous, e.g., with one or more locomotives up front, others in the middle and at the rear for train. Such configurations are called distributed power wherein the standard connection between the locomotives is replaced by radio link or auxiliary cable to link the locomotives externally. When operating in distributed power, the operator in a lead locomotive can control operating functions of remote locomotives in the consist via a control system, such as a distributed power control element. In particular, when operating in distributed power, the operator can command each locomotive consist to operate at a different notch power level (or one consist could be in motoring and other could be in braking) wherein each individual in the locomotive consist operates at the same notch power.

Trains with distributed power systems can be operated in different modes. In one mode all locomotives in the train operate at the same notch command. If the lead locomotive is commanding motoring at notch N8, all units in the train are commanded to generate motoring at notch N8. In an "independent" control mode, locomotives or sets of locomotives distributed throughout the train can be operated at different motoring or braking powers. For example, as a train crests a mountaintop, the lead locomotives (on the down slope of mountain) may be placed in braking mode, while the locomotives in the middle or at the end of the train (on the up slope of mountain) may be in motoring. This is done to minimize tensile forces on the mechanical couplers that connect the railcars and locomotives. Traditionally, operating the distributed power system in "independent" mode required the operator to manually command each remote locomotive or set of locomotives via a display in the lead locomotive. Using the physics based planning model, train set-up information, on-board track database, on-board operating rules, location determination system, real-time closed loop power/brake control, and sensor feedback, the system can automatically operate the distributed power train in "independent" mode.

When operating in distributed power, the operator in a lead locomotive can control operating functions of remote locomotives in the remote consists via a control system, such as a distributed power control element. Thus when operating in distributed power, the operator can command each locomotive consist to operate at a different notch power level (or one consist could be in motoring and other could be in braking) wherein each individual locomotive in the locomotive consist operates at the same notch power. In an exemplary embodiment, with the present invention installed on the train, preferably in communication with the distributed power control element, when a notch power level for a remote locomotive consist is desired as recommended by the optimized trip plan, an embodiment of the invention communicates this power setting to the remote locomotive consists for implementation. As discussed below, brake applications are similarly implemented.

When operating with distributed power, the optimization problem previously described can be enhanced to allow additional degrees of freedom, in that each of the remote units can be independently controlled from the lead unit. The value of this is that additional objectives or constraints relating to in-train forces may be incorporated into the performance function, assuming the model to reflect the in-train forces is also included. Thus various aspects of the present invention may include the use of multiple throttle controls to better manage in-train forces as well as fuel consumption and emissions.

In a train utilizing a consist manager, the lead locomotive in a locomotive consist may operate at a different notch power setting than other locomotives in that consist. The other locomotives in the consist operate at the same notch power setting. Embodiments of the present invention may be utilized in conjunction with the consist manager to command notch power settings for the locomotives in the consist. Thus since the consist manager divides a locomotive consist into two groups, lead locomotive and trailing units, the lead locomotive will be commanded to operate at a certain notch power and the trail locomotives can be commanded to operate at a different notch power. In an exemplary embodiment the distributed power control element may be the system and/or apparatus where this operation is performed.

Likewise, when a consist optimizer is used with a locomotive consist, an embodiment of the present invention can be used in conjunction with the consist optimizer to determine notch power for each locomotive in the locomotive consist. For example, suppose that a trip plan recommends a notch power setting of four for the locomotive consist. Based on the location of the train, the consist optimizer will take this information and then determine the notch power setting for each locomotive in the consist. In this implementation, the efficiency of setting notch power settings over intra-train communication channels is improved. Furthermore, as discussed above, implementation of this configuration may be performed utilizing the distributed control system.

Furthermore, as discussed previously, an embodiment of the present invention may be used for continuous corrections and re-planning with respect to when the train consist uses braking based on upcoming items of interest, such as but not limited to railroad crossings, grade changes, approaching sidings, approaching depot yards and approaching fuel stations where each locomotive in the consist may require a different braking option. For example, if the train is coming over a hill, the lead locomotive may have to enter a braking condition whereas the remote locomotives, having not reached the peak of the hill may have to remain in a motoring state.

Figure 8:
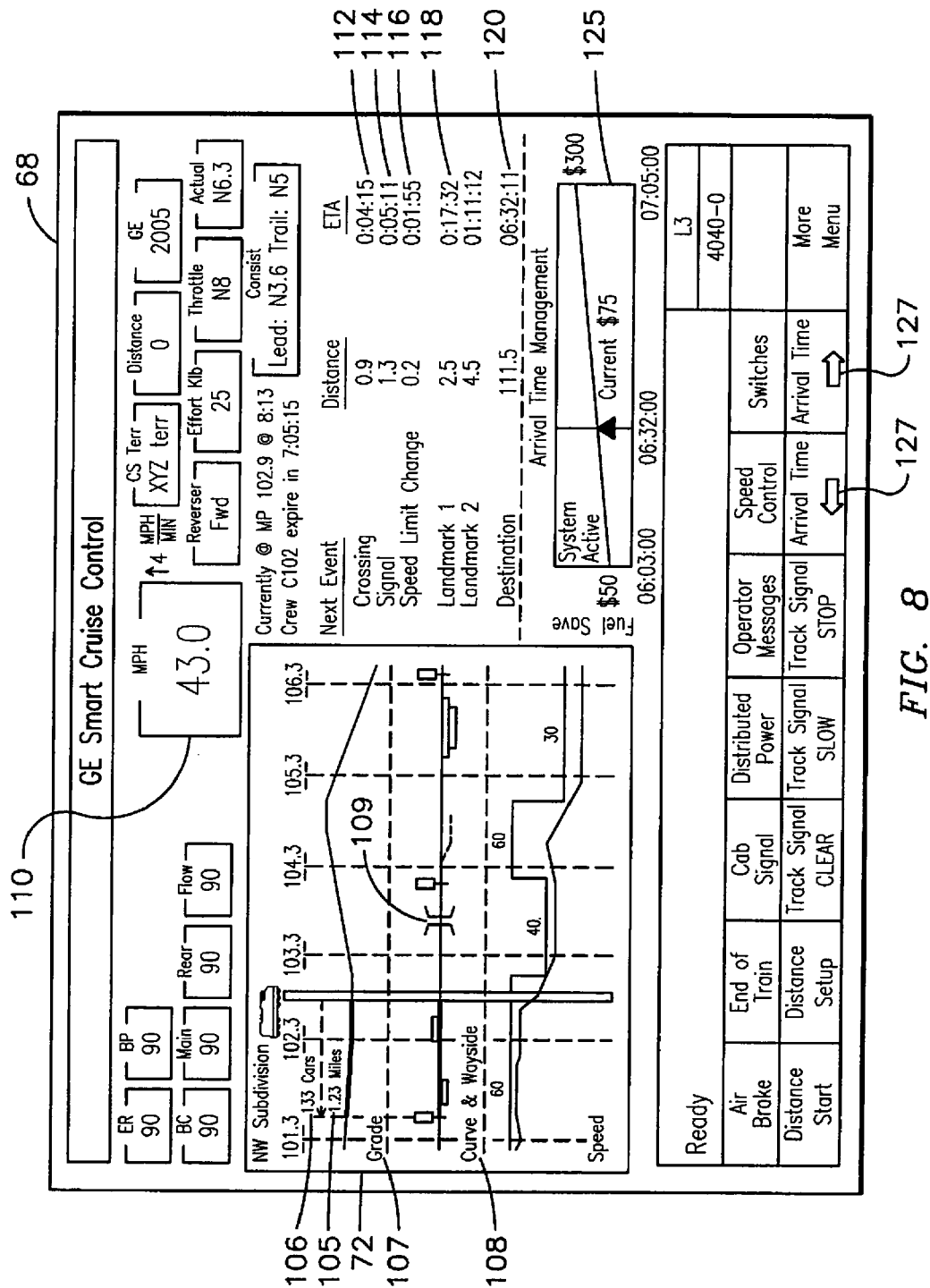
FIG. 8 depicts an exemplary illustration of a dynamic display for use by the operator.
Figure 9:
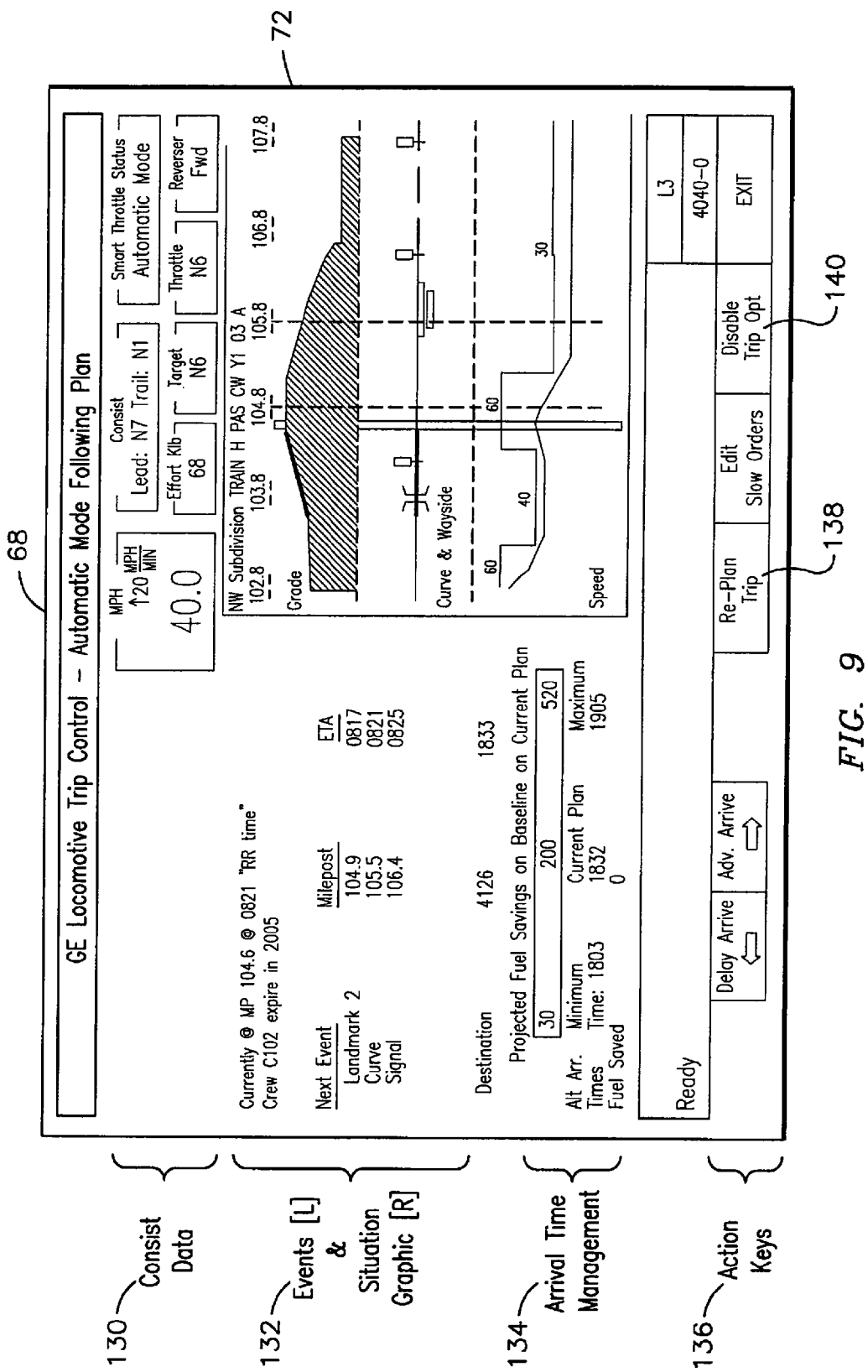
FIG. 9 depicts another exemplary illustration of a dynamic display for use by the operator.
Figure 10:
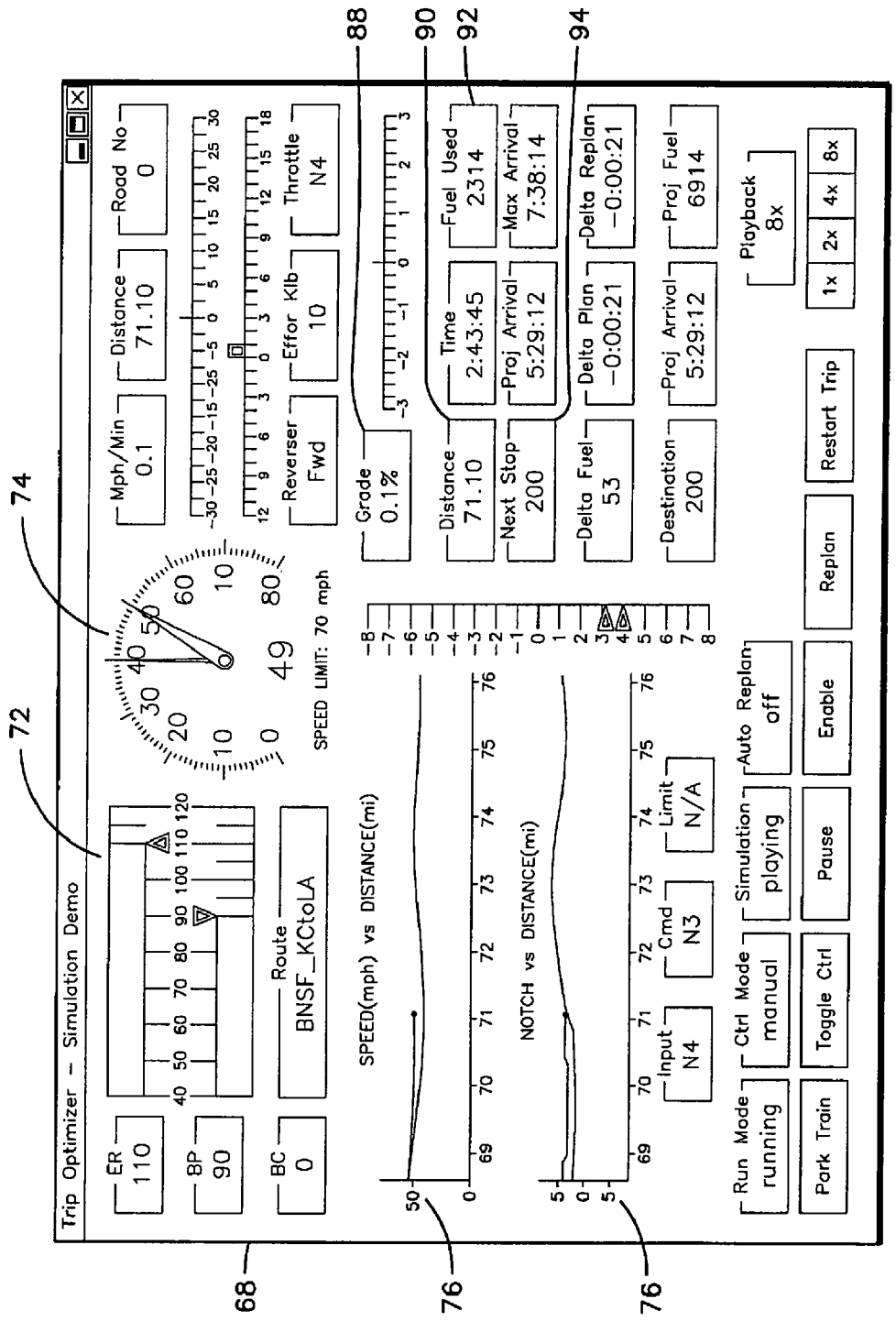
FIG. 10 depicts another exemplary illustration of a dynamic display for use by the operator.

FIGS. 8, 9 and 10 depict exemplary illustrations of dynamic displays for use by the operator. FIG. 8 illustrates a provided trip profile 72. Within the profile a location 73 of the locomotive is indicated. Such information as train length 105 and the number of cars 106 in the train is provided. Elements are also provided regarding track grade 107, curve and wayside elements 108, including bridge location 109 and train speed 110. The display 68 allows the operator to view such information and also see where the train is along the route. Information pertaining to distance and/or estimated time of arrival to such locations as crossings 112, signals 114, speed changes 116, landmarks 118 and destinations 120 is provided. An arrival time management tool 125 is also provided to allow the user to determine the fuel savings realized during the trip. The operator has the ability to vary arrival times 127 and witness how this affects the fuel savings. As discussed herein, those skilled in the art will recognize that fuel saving is an exemplary example of only one objective that can be reviewed with a management tool. Thus, depending on the parameter being viewed, other parameters, discussed herein can be viewed and evaluated with a management tool visible to the operator. The operator is also provided with information regarding the time duration that the crew has been operating the train. In exemplary embodiments time and distance information may either be illustrated as the time and/or distance until a particular event and/or location or it may provide a total elapsed time.

As illustrated in FIG. 9 an exemplary display provides information about consist data 130, an events and situation graphic 132, an arrival time management tool 134 and action keys 136. Similar information as discussed above is provided in this display as well. This display 68 also provides action keys 138 to allow the operator to re-plan as well as to disengage 140 the apparatus of the different embodiments of the invention.

FIG. 10 depicts another exemplary embodiment of the display. Typical information for a modern locomotive including air-brake status 72, analog speedometer with digital inset 74, and information about tractive effort in pounds force (or traction amps for DC locomotives) is visible. An indicator 74 shows the current optimal speed in the plan being executed as well as an accelerometer graphic to supplement the readout in mph/minute. Important new data for optimal plan execution is in the center of the screen, including a rolling strip graphic 76 with optimal speed and notch setting versus distance compared to the current history of these variables. In this exemplary embodiment, location of the train is derived using the locator element. As illustrated, the location is provided by identifying how far the train is away from its final destination, an absolute position, an initial destination, an intermediate point and/or an operator input.

The strip chart provides a look-ahead to changes in speed required to follow the optimal plan, which is useful in manual control and monitors plan versus actual during automatic control. As discussed herein, such as when in the coaching mode, the operator can either follow the notch or speed suggested by the present invention. The vertical bar gives a graphic of desired and actual notch, which are also displayed digitally below the strip chart. When continuous notch power is utilized, as discussed above, the display will simply round to closest discrete equivalent, the display may be an analog display so that an analog equivalent or a percentage or actual horse power/tractive effort is displayed.

Critical information on trip status is displayed on the screen, and shows the current grade the train is encountering 88, either by the lead locomotive, a location elsewhere along the train or an average over the train length. A cumulative distance traveled in the plan 90, cumulative fuel used 92, the location of or the distance to the next stop as planned 94 and current and projected arrival time 96 at the next stop are also disclosed. The display 68 also shows the maximum possible time to destination with the computed plans available. If a later arrival is required, a re-plan is executed. Delta plan data shows status for fuel and schedule ahead or behind the current optimal plan. Negative numbers mean less fuel or early compared to plan, positive numbers mean more fuel or late compared to plan. Typically these parameters trade-off in opposite directions (slowing down to save fuel makes the train late and conversely).

At all times these displays 68 gives the operator a snapshot of the trip status with respect to the currently instituted driving plan. This display is for illustrative purpose only as there are many other ways of displaying/conveying this information to the operator and/or dispatch. Towards this end, any other items of information disclosed above can be added to the display to provide a display that is different than those disclosed.

Other features that may be included in other embodiments of the present invention include, but are not limited to, generating of data logs and reports. This information may be stored on the train and downloaded to an off-board system. The downloads may occur via manual and/or wireless transmission. This information may also be viewable by the operator via the locomotive display. The data may include such information as, but not limited to, operator inputs, time system is operational, fuel saved, fuel imbalance across locomotives in the train, train journey off course and system diagnostic issues, such as a GPS sensor malfunction.

Since trip plans must also take into consideration allowable crew operation time, embodiments of the invention may take such information into consideration as a trip is planned. For example, if the maximum time a crew may operate is eight hours, then the trip can be fashioned to include stopping location for a new crew to replace the present crew. Such specified stopping locations may include, but are not limited to rail yards, meet/pass locations, etc. If, as the trip progresses, the trip time may be exceeded, one embodiment of the invention may be overridden by the operator to meet other criteria as determined by the operator. Ultimately, regardless of the operating conditions of the train, such as but not limited to high load, low speed, train stretch conditions, etc., the operator remains in control to command a safe speed and/or operating condition of the train.

According to different aspects of the present invention, the train may operate in a plurality of different operational concepts. In one operational concept the present invention provides commands for commanding propulsion and dynamic braking. The operator handles all other train functions. In another operational concept, the present invention provides commands for commanding propulsion only. The operator handles dynamic braking and all other train functions. In yet another operational concept, the present invention provides commands for commanding propulsion, dynamic braking and application of the airbrake. The operator handles all other train functions.

Embodiments of the present invention may also notify the operator of upcoming items of interest or actions to be taken, such as forecasting logic of the present invention, the continuous corrections and re-planning to the optimized trip plan, the track database. The operator can also be notified of upcoming crossings, signals, grade changes, brake actions, sidings, rail yards, fuel stations, etc. These notifications may occur audibly and/or through the operator interface.

Specifically using the physics based planning model, train set-up information, on-board track database, on-board operating rules, location determination system, real-time closed loop power/brake control, and sensor feedback, the system presents and/or notify the operator of required actions. The notification can be visual and/or audible. Examples include notification of crossings that require the operator to activate the locomotive horn and/or bell and "silent" crossings that do not require the operator to activate the locomotive horn or bell.

In another exemplary embodiment, using the physics based planning model discussed above, train set-up information, on-board track database, on-board operating rules, location determination system, real-time closed power/brake control, and sensor feedback, one embodiment of the present invention may present the operator information (e.g. a gauge on display) that allows the operator to see when the train will arrive at various locations, as illustrated in FIG. 9. The system allows the operator to adjust the trip plan (target arrival time). This information (actual estimated arrival time or information needed to derive off-board) can also be communicated to the dispatch center to allow the dispatcher or dispatch system to adjust the target arrival times. This allows the system to quickly adjust and optimize for the appropriate target function (for example trading off speed and fuel usage).

Multiple railway vehicles (locomotives, railcars, trains, maintenance-of-way vehicles and other powered vehicles) operate over a railroad network within fixed or moveable track segments (referred to as track blocks) with a real or synthetic signal at a block entry point indicating a current status of the block. The signal advises an operator of the railway vehicle approaching the block whether entry to the block is permitted and if so, may also advise a restricted speed at which the block can be entered. The block entry speed is typically determined responsive to a state of the next succeeding block(s) along the vehicle's current travel path.

A block signal comprises a signal aspect (a visual element such as a colored light or an arm position) that provides a signal indication. The indication advises the vehicle operator whether the block can be entered and may further advise vehicle speed(s) as the vehicle enters and travels through the block. For example, the indication may command the vehicle to reduce speed immediately upon entering the block or at a specified location within the block. The indication may also command speed limits for the next block. A block occupancy detector senses whether a vehicle occupies a block and associated control components configure the block signals preceding the occupied block accordingly.

There are many different types of block signal aspects, each having unique indications associated with the aspects. For example, lighted signals may comprise a single colored light controlled to an on or off state or a multi-colored lens illuminated by a single light where lens movement is controlled to position the desired lens color in front of the light. Other light signals comprise multiple lights operative with multiple colored lens and flashing lights.

Although the vehicle operator will visually perceive the signal aspect as the vehicle approaches the aspect, various on-board components also communicate the aspect to the operator. Electrical components near the track signal generate an electrical signal representative of the signal aspect. As the vehicle passes over or proximate these components, the electrical signal is transferred to an inductive pick-up coil on the locomotive. The operator is thereby presented with an indication of the signal aspect within the locomotive cab. Other signaling systems comprise a wireless communications link between the track signal and the locomotive.

A vehicle approaching a block occupied by another vehicle will see (typically) a red aspect indicating that the vehicle must stop short of the block. A vehicle approaching an unoccupied block (a clear block) will typically see a green aspect indicating that the vehicle can enter the block at its current speed.

Various configurations of yellow aspects indicate restricted speed entry and restricted speed traversal through the block. For example, a track segment comprises first and second serial blocks with a first vehicle approaching the first block and a second vehicle occupying the second block. The approaching first vehicle may be permitted to enter the first block but at a restricted speed that allows the first vehicle to safely stop if it reaches the entry point of the second block before the second vehicle exits the second block. Thus vehicles traverse the rail network block-by-block with entry to each block controlled to avoid a situation where two vehicles occupy the same block.

Track switches that can direct an approaching vehicle along two or more track branches may also be protected with a signal. A switch signal indicates the status of the block defined by the switch branches and may further indicate the switch position, allowing the approaching vehicle operator to determine if the switch is set for the desired track branch.

Block signal aspects (and switch signal aspects) and the associated indication accurately advise the real time status of the block (and the switch) based on the occupancy state of the block. However, to control the rail network and the movement of individual vehicles on the network, it may be necessary for a dispatcher to set block signals and switch signals according to projected future locations of the vehicles traversing the network. Such predictions of future vehicle locations are increasingly less accurate as the predictions extend later into the future. The unpredictable nature of vehicle movement may cause the dispatcher to conservatively set the signals, resulting in reduced efficiency across the rail network.

The uncertainty of these future block and switch signal predictions is due to many uncontrollable causes including, but not limited to, environmental conditions such as weather, snow, ice and storms; equipment mechanical failures such as cars, locomotives, rails and wayside equipment; crew operating behaviors such as vehicle handling and speed settings; maintenance efforts such as track and wayside equipment repairs and vehicle accidents and derailments. As a result, the state of any block signal or switch signal for a track segment where at least two vehicles cross or utilize the same track segment is known accurately only for the past states up to and including the current state.

The embodiments of the trip optimizer described above slow the vehicle or stop the vehicle based on the status of the next block or switch signal on the vehicle's travel path. Generally, the trip optimizer algorithm reduces the speed at a rate that minimizes fuel consumption, allowing the vehicle to reach the desired speed at the desired track location as required to enforce block occupancy rules and speed restrictions. For example, if a first vehicle is presented with a restricted indication as it enters a block, standard vehicle control rules require the vehicle to slow to a designated speed so that it can safely stop before entering the next block in the event a second vehicle currently occupying the next block has not vacated that block when the first vehicle reaches the block entry point.

According to other embodiments of the trip optimizer, the state of block signals ahead are anticipated or probabilistically-determined and the vehicle's speed trajectory is controlled according to the most likely future block states, thereby optimizing fuel consumption while increasing network throughput. If the current status of the next few (e.g. one, two, three or more) signals are known (as determined by their respective block occupancies), and the location, speed, time of arrival and/or travel direction of other vehicles that may intercept the vehicle's path (e.g., travel parameters) are known, the trip optimizer probabilistically determines the future state of signals that the vehicle will encounter. Responsive thereto, the trip optimizer modifies the vehicle's speed trajectory (tractive and braking effort applications) based on the determined probability that succeeding block signals will change/clear before the vehicle reaches those signals. Since a probabilistic determination cannot definitively determine the future state of succeeding signals, the trip optimizer further controls the vehicle's speed trajectory to permit the vehicle to be safely stopped or slowed if a real time signal state presented to the vehicle differs from the predicted state.

A probabilistic determination can indicate whether track blocks along the vehicle's travel path may clear as a vehicle approaches those blocks, allowing unimpeded entry to the clear block. Multiple vehicle and track network parameters and conditions must be considered in determining this probability. If the determined probability is relatively high, the vehicle is controlled according to a speed trajectory responsive to the predicted block states. Generally, the trip optimizer would not use low probability predicted future block occupancies to control the vehicle.

For example, assume a forward block is currently occupied, but it is determined with a relatively high probability that the block will be clear when the vehicle reaches the block entry point. The vehicle's trip optimizer thus determines the vehicle's speed trajectory according to the prediction that the block will be clear. The vehicle's fuel consumption is thereby optimized during this travel interval.

However, the speed trajectory must also consider the possibility that the forward block does not clear as predicted. Recognizing that this condition is less likely than a cleared block, the speed trajectory includes a delayed onset of a speed reduction, that is, the speed reduction is delayed to a later time or a forward track location that provides sufficient time/distance to stop or slow the vehicle as required if the block ahead is not clear. However, the delayed onset of the speed reduction may require a more aggressive brake application to slow or stop the vehicle. But recognize that the likelihood the more aggressive brake application will in fact be necessary is low.

Thus the trip optimizer of one embodiment further optimizes fuel consumption during a vehicle trip while satisfying the block occupancy rules. If the predictions as to future block occupancies are wrong, some fuel optimization may nonetheless be realized. Further, application of these probabilistic concepts throughout the rail network will improve the fuel-efficiency for the majority of the vehicles for the majority of their encounters with predictable track occupancies. Although the fuel consumption for individual vehicles may not always be optimized, fuel consumption on the entire rail network will be improved.

Events that are closer in time can be predicted with greater accuracy and can therefore be implemented in the trip optimizer speed trajectory with greater confidence that they will be followed. For example, for a track network including a first and a second serial block, if a vehicle ahead is nearly clear of the second block, then it may be unnecessary to slow the vehicle of interest as it enters the first block since the vehicle ahead will likely clear the second block before the vehicle of interest arrives at the entry point to the second block. The trip optimizer algorithm accordingly modifies the speed trajectory of the vehicle of interest based on the probability that the signal will clear, permitting it to travel through the block at a maintained speed.

In one embodiment, the trip optimizer uses a threshold probability to determine the speed trajectory. For example, if the probability that the forward block will clear is greater than a predetermined threshold probability, then the speed trajectory is determined assuming a forward cleared block, with allowances to stop or slow the vehicle as required if future events are not as predicted.

In another embodiment, in lieu of using a threshold probability value, the determined probability controls the time/track location at which the speed reduction is initiated. A lower probability that the forward block will clear (that is, the vehicle will see a green indication and thus be permitted to enter the block at its current speed) will result in an earlier (i.e., time/track location) speed reduction initiation. The time/track location where the speed reduction begins is responsive to the probability.

A higher probability that the light forward block will clear results in a later onset of the speed reduction. The time/track location where the speed reduction begins is again responsive to the probability value. However, the time/track location for initiation of the speed reduction is always determined to permit compliance with the track signals as the vehicle encounters them in real time.

Operating information, such as location of the vehicles, their speed and travel path, required to determine the above-described probabilities may be supplied over a wireless communications link, for example, from a railroad dispatch center, for use by an on-board trip optimizer. Alternatively, the information can be supplied over other communications links between the locomotive and the dispatch center.

In a railroad network with communications links between operating vehicles the information can be supplied directly between the vehicles on the same travel path. The information can be provided by vehicles ahead of the vehicle of interest. For example, a vehicle ahead can advise one or more of its speed, position and estimated time of clearing the block. Alternatively, if the vehicle ahead supplies one or more of location, speed, speed trajectory (based on grade/track information) distance to the next block, the trip optimizer algorithm executing on board the vehicle of interest can compute the predicted state of the next block. In yet another embodiment, the vehicle of interest can estimate the time at which the next block will clear based on the type of vehicle ahead, e.g., passenger, high priority or low priority.

Information from which the probability of a cleared block ahead can be determined can also be supplied from the signals directly to the vehicles.

Depending on the location where the trip optimization algorithm executes, the operating information can be transferred to that location by wired, wireless, radio frequency, acoustic, power line carrier, optical and manual operator techniques.

According to another embodiment, the trip optimizer uses knowledge of past experiences or commonly encountered indications of succeeding signals to predict the state of those signals and develop a speed trajectory according to those predictions. If there is a relatively high probability (based on the past experiences) that the signal will clear, it may not be necessary for the vehicle to slow down. Instead, the speed reduction (either by application of braking effort or reducing the tractive effort) can be delayed to a later time or track location. At that time or track location the real time signal status is determined and a decision made relative to vehicle control, e.g., if the signal has not cleared, begin to slow the vehicle as required to stop at the desired location or if the signal has cleared, allow the vehicle to pass through the block at speed.

Figure 11A:
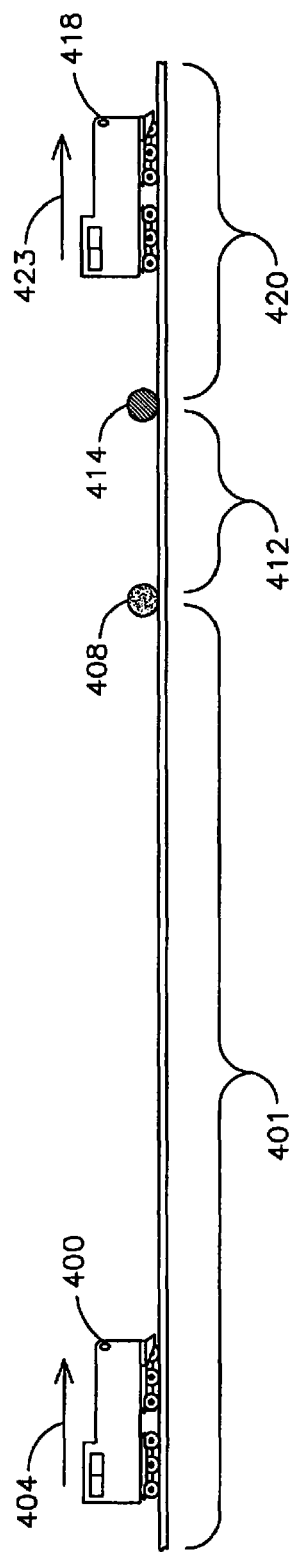
FIGS. 11A and 11B depict track blocks and signals and a locomotive speed trajectory as related to the embodiments of the present invention.
Figure 11B:
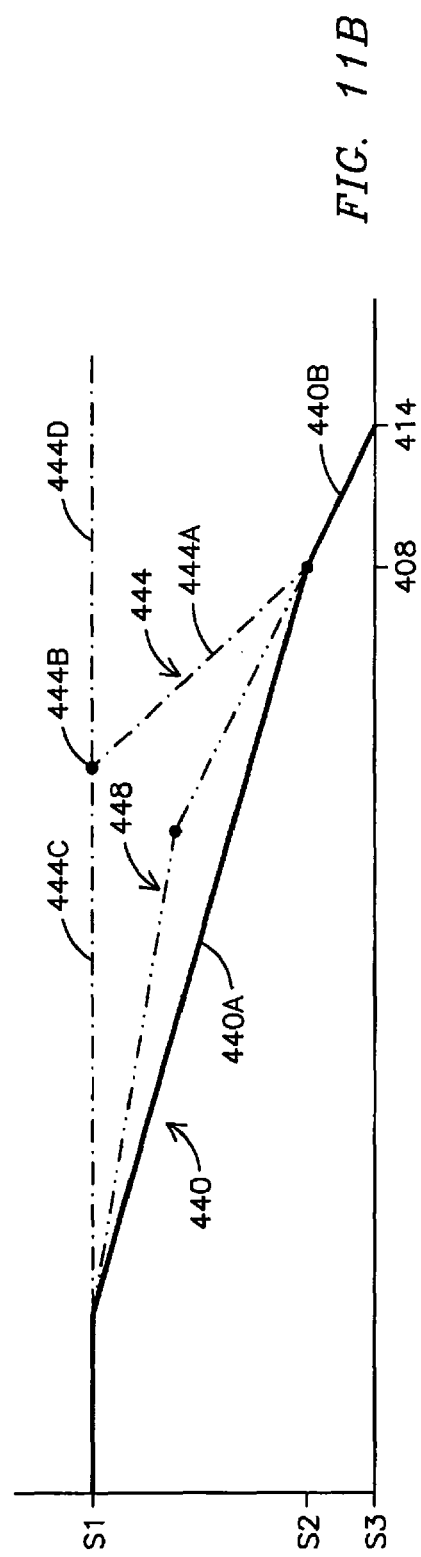

FIGS. 11A and 11B illustrate the described concepts for a railroad train. A train 400 in a block 401 and traveling in a direction indicated by an arrowhead 404 approaches a yellow signal aspect 408 at an entry point of a block 412 and a red signal aspect 414 at an entry point of a block 420. A train 418 traveling in a direction indicated by an arrowhead 423 appears to be nearing an exit of the block 420.

FIG. 11B illustrates a speed trajectory 440 for the train 400 when no information regarding the state of the blocks 412 and 420 is known by the train 400 as it traverses the block 401. Speed values are set forth on the abscissa and time, distance or location are set forth on the ordinate. As can be seen, according to a trajectory segment 440A, the train slows from a speed S1 to achieve a speed S2 at the signal 408. The speed S2 is sufficiently slow to allow the train to decelerate so that it can stop at the entry point of the block 420 (the signal aspect 414) if the train 418 has not exited the block 420 when the train 400 reaches the entry point.

A different deceleration function or a trajectory segment 440B can be employed in the block 412 so that a speed S3 is zero at the signal aspect 414. Alternatively, the trajectory segments 440A and 440B can be similar, each trajectory segment (and the speed S2) can be determined according to required practices of the railroad and/or each speed trajectory can be determined based on the type and priority of the trains 400 and 418, their speed and direction of travel and the speed value S1. The speed trajectories 440A and 440B can alternatively be non-linear.

In an embodiment where the trip optimizer predicts future signal aspects based on future block occupancies, if there is a relatively high probability that the block 420 will clear before the train 400 reaches the block entry point (the signal aspect 414), the train 400 is controlled according to an exemplary speed trajectory 444. This trajectory permits the train 400 to maintain its speed S1 along a trajectory segment 444C until a point (or time) 444B is reached at which time the train 400 begins to decelerate along the trajectory 444A if the block 420 is not clear at that time. If the block 420 is clear at the point 444B, then the train 400 continues on a speed trajectory 444D.

The point 444B is selected to permit the train 400 to reach the speed S2 at the signal aspect 408 by decelerating according to the speed trajectory 444A, and can be further selected responsive to the probability that the train 418 will clear the block 420 before the train 400 reaches the signal aspect 414. For example, the deceleration initiation point 444B is moved back in time (allowing for a less aggressive deceleration or braking effort to reach the speed S2 at the signal aspect 408) responsive to a relatively low probability that the block 420 will clear. The deceleration initiation point 444B is moved ahead in time (requiring a more aggressive deceleration or braking effort to reach the speed S2 at the signal aspect 408) responsive to a relatively high probability that the block 420 will clear. If the point 444B is the last point or time at which the train can begin to decelerate to reach the speed S2 at the signal aspect 408, and there is a relatively low probability that the block 420 will clear before the train 400 reaches the signal aspect 408, efficient railroad and train operation suggests earlier initiation of the deceleration to conserve fuel.

As an alternative to moving the deceleration point 444B or in addition thereto, the slope of the trajectory segment 444A can be controlled responsive to the determined probability.

Note that the speed trajectory 444 decelerates the train 400 to the speed S2 at the same point or time as the speed trajectory 440, but requires more aggressive braking, as indicated by a larger slope magnitude for the trajectory line segment 444A than for the trajectory line segment 440A. However, in a situation where the point 444B is selected based on a relatively high probability that while the train 400 is traversing the speed trajectory 444C (i.e., prior to beginning its speed reduction at a point 444B on the trajectory 444) the block 420 will clear, it is highly likely that the train 400 will be permitted to pass through the cleared signal 414 and thus in fact no speed reduction will be required. Although the speed reduction of the trajectory 400 may be somewhat unusual in that the braking is more aggressive than commonly employed, recognize that this trajectory is unlikely to be implemented since the probability is high that the train 418 will exit the block 420 and clear the signal 414 before the train 400 reaches the entry point for the block 420. However, in the event that the train 418 does not clear the block 420 as predicted, the train 400 is slowed to the correct speed S2 at the correct location and train safety is not compromised.

Each of the various speed trajectories and the segments thereof (and the speed S2) as set forth in FIG. 11B, may be determined according to required practices of the railroad and/or each speed trajectory can be determined based on the type and priority of the trains 400 and 418 and the speed value S1. The speed trajectories may be non-linear, increasing in speed with time or decreasing in speed with time, depending on the determined probabilities, railroad operations and other train parameters.

Although the probability determined features of the present invention may be described with respect to a quantified probability value, other embodiments may employ probability ranges or qualitative estimates of the likelihood or probability, especially since it is recognized that there are a plurality of factors, including time-variant factors, that affect the travel of the train 418 through the block 420 and thus impact the probability that the train 418 will clear the block 420 before a desired time.

In yet another embodiment, the vehicle's speed through a block is responsive to a probabilistically determined block exit speed (or switch pass speed). That is, the speed is reduced at a first rate responsive to a relatively high probability that the next block will not clear in time, and the speed is reduced (or maintained or even increased) at a second rate responsive to a relatively high probability that the next block will clear in time. Thus the speed reduction rate and the target speed at the end of the speed reduction interval are responsive to the probability that the next block will clear before the train 400 reaches the block entry point. A speed trajectory 448 illustrated in FIG. 11B depicts such a different deceleration rate compared with the speed trajectory 444, and may be implemented according to a lower probability that the block 420 will clear than the probability associated with the speed trajectory 444.

The speed control and braking mechanisms described herein attempt to limit fuel consumption and reduce braking efforts responsive to determined probabilities or likelihood estimates as to future block occupancies along a vehicle's travel path. These technique reduce the "hurry up and wait" scenario common in railroad operations today.

In another embodiment, the likelihood of the train 418 clearing the block 420 is determined continuously or at a plurality of time points during the trajectory segment 444C. As the calculated probability increases, the point 444B at which the speed reduction begins can be moved forward in time and as the probability decreases the point 444B can be moved back in time.

According to another embodiment, vehicle performance may be improved if the trip optimizer considers information about previous operations over the same segment of track in developing an optimized trip plan for the current trip. For example, information is supplied to the trip optimizer regarding the following conditions during previous trips over the same track segment: signal status, operator actions, unexpected vehicle or track conditions and vehicle congestion. This information is used to develop a statistical basis for planning the trip, assuming that high priority events will occur as they have in the past. For example, if certain signal aspects were present for 90% of the previous trips on the track segment, the trip optimizer assumes that the same signals will present in the current trip and accordingly develops the speed trajectory.

During the planned trip, the trip optimizer checks the real-time signal aspects with sufficient time allotted to allow it to slow the vehicle safely in the event the signal aspects are not as they had been predicted. Thus, notwithstanding its probabilistic basis, the trajectory includes sufficient margin (time and/or distance) for safely controlling the vehicle under circumstances where the real time events differ from the predicted events.

As a result of these statistical considerations, on an aggregate basis, the trip optimizer improves vehicle efficiency. That is, while the optimization of each trip may not be improved because the signal aspects are different than predicted and the vehicle may therefore need to be slowed or stopped along an "inefficient" speed trajectory, vehicle efficiency will be improved for a majority of the vehicle trips, i.e., the overall enterprise efficiency is improved.

Because vehicle and track conditions may be different than assumed by the trip optimizer in generating the speed trajectory, there may be unnecessary brake applications that cause increased fuel consumption. Similarly, as certain conditions (e.g., vehicle congestion) occur during nearly every vehicle run on a particular track segment, another embodiment of the trip optimizer considers this statistical information in developing the speed trajectory.

Thus according to another embodiment of the invention, the trip plans are generated based not on the worst case or best case efficiency, but instead based on the most likely operating conditions or on a range of likely operating conditions, by considering the statistical nature of these conditions. Whereas certain trip optimizer embodiments use only discrete data to develop the speed trajectory, this embodiment provides an improvement by further using statistical information that may offer, at least in the aggregate, improved performance.

For each switch or block signal there exists a typical or most probable setting dependent on vehicle traffic patterns such as the time of day, season, type of traffic, etc. If the most probable setting can be determined, the vehicle speed is adjusted such that an optimum block/switch exit speed is attained. In lieu of determining the average setting, other statistical parameters (such as a two sigma limit) could be used depending on variations of the signal setting from the mean and the amount of fuel efficiency improvement that can be attained.

According to another embodiment of the present invention, the overall mission speed is calculated to optimize an operating parameter within the blocks and optimize a block exit speed. That is, if a planning tool adds a time buffer at the end of a routing block, then at the logical interface between the block and time buffer, the overall speed can be optimized to permit use of the time buffer for a lower block speed avoiding insertion of a large speed transition. Thus the time buffers, when employed, can be considered in the speed trajectories set forth above to minimize large speed transitions, i.e., large brake applications.

In another embodiment, arbitration between two vehicles competing for the same rail resource is considered by the trip optimizer. The vehicle that provides the more efficient operating result is selected to utilize the resource, thereby optimizing fuel consumption and/or network efficiency, since it is unlikely that the speed trajectory for both vehicles can be optimized. For example, when two vehicles approach an intercept where they each require use of a single track segment, the arbitration mechanism determines which of the two choices will result in a more optimized rail network.

The optimization algorithm determines the better choice based on individual vehicle operational parameters and rail network parameters. Vehicle fuel efficiency, maximum allowed rail speed, average rail speed, priority order for destination arrival are some of the factors that are considered by the optimization algorithm. Also, the results of previous encounters by similar vehicles over the similar track segments can also be considered by the algorithm. For example, a prior encounter may have produced excessive incremental braking for one of the vehicles or caused one of the vehicles to exceed an acceleration limit. The priority determination can also be based on local, regional or network levels and can include, but is not limited to, cargo, time to arrival, fuel efficiency, time to a required crew change, crew change point, health of the individual vehicles, emission requirements, etc.

Optimization algorithms are generally known and can use any of the following techniques to optimize the function: success of approximation, look-up tables, closed form solutions, Kalman filters, time series Taylor, expansions or any combination of these techniques.

Data for use in the optimization algorithms described above (which can be executed either on-board the vehicle or at a dispatch center) can be provided by a manual data transfer from off-board equipment such as from a local, regional or global dispatch center to the vehicle. If the algorithms are executed in wayside equipment, the necessary data can be transferred thereto by passing vehicles or via a dispatch center. The data transfer can also be performed automatically using off-board, on-board or wayside computer and data transfer equipment. Any combination of manual data transfer and automatic data transfer with computer implementation anywhere in the rail network can be accommodated according to the teachings of different embodiments of the present inventions.

The present inventions contemplate multiple options for the host processor computing the optimization data, including processing the algorithm on the locomotive of the vehicle to be optimized, within wayside equipment, off-board (in a dispatch-centric model) or at another location on the rail network. Execution can be prescheduled, processed in real time or driven by an designated event such as a change in vehicle or locomotive operating parameters, that is operating parameters related to either the vehicle of interest or other vehicles that may be intercepted by the vehicle of interest.

The methods and apparatus of the embodiments of the invention offer improved locomotive fuel efficiency and network efficiency (at local, regional and global levels). The optimization technique also provide the ability to trade off efficiency, speed and priorities. Since the techniques of the invention embodiments are scalable, they can provide an immediate rail network benefit even if not implemented throughout the network. Local tradeoffs can also be considered without the necessity of considering the entire network. Later vehicles will encounter better slack time at a higher average velocity. More vehicles can therefore be carried along the same track without additional track resource expenditures.

While the various embodiments of the invention have been described in what is presently considered to be a preferred embodiment, many variations and modifications will become apparent to those skilled in the art. For example, although described in the context of a railroad network over which trains comprising locomotives and railcars operate, the teachings of the invention are also applicable to other rail-based systems and vehicles including, but not limited to, interurban trains, people movers and trams. Accordingly, it is intended that the invention not be limited to the specific illustrative embodiments but be interpreted within the full spirit and scope of the appended claims.

What is claimed is:

1. A system comprising:
a sensor configured to obtain speed information representative of actual speeds that a first railway vehicle is traveling along a railway; and
a first processor configured to be disposed onboard the first railway vehicle and communicatively coupled with the sensor for receiving the speed information as the first railway vehicle is traveling along the railway, the processor being further configured to obtain a trip plan including designated speeds that the first railway vehicle is to travel along the railway for a trip, the designated speeds of the first railway vehicle expressed as a function of at least one of distance or time along the trip to reduce at least one of emissions generated or fuel consumed by the first railway vehicle during the trip relative to traveling according to one or more other speeds during the trip,
wherein the first processor is configured to receive the speed information during the trip and determine differences between the actual speeds of the first railway vehicle and the designated speeds of the trip plan, and wherein the first processor is further configured to modify one or more of the designated speeds of the trip plan based on the differences between the actual speeds and the designated speeds as the first railway vehicle travels along the railway.

2. The system of claim 1, wherein the trip plan is one of a plurality of trip plans obtained by the first processor, and the first processor is configured to present the plurality of trip plans to an operator of the first railway vehicle so the operator can select the trip plan from the plurality of trip plans for use in controlling movement of the first railway vehicle.

3. The system of claim 2 wherein the first processor is configured to modify the trip plan for the first railway vehicle based on a speed trajectory of the second railway vehicle.

4. The system of claim 3 wherein the first processor is configured to modify the trip plan based on the speed trajectory of the second railway vehicle on a second track segment that is rearward of a first track segment that is occupied by the first railway vehicle relative to a direction of travel of the first railway vehicle.

5. The system of claim 2 wherein the first processor is configured to modify the trip plan to avoid the first railway vehicle and the second railway vehicle concurrently occupying a common track segment of the railway.

6. The system of claim 2 wherein the first processor is configured to modify the trip plan based on at least one of track conditions of the railway or an operating condition of at least one of the first railway vehicle or the second railway vehicle.

7. The system of claim 2 wherein the first processor is configured to modify the trip plan based on a relative priority between the first railway vehicle and the second railway vehicle.

8. The system of claim 2 wherein the first processor is configured to receive a location of the second railway vehicle based on location information received from at least one of a remote site or wayside equipment.

9. The system of claim 2 wherein the first railway vehicle and the second railway vehicle each comprise a train having at least one locomotive and one or more railcars.

10. The system of claim 1 wherein the first processor is configured to create the trip plan based on one or more travel parameters that include one or more of a scheduled destination location of the first railway vehicle, a current speed of the first railway vehicle, a type of the first railway vehicle, a scheduled time of arrival of the first railway vehicle at the scheduled destination location, a direction of travel of the first railway vehicle toward the scheduled destination location, or a priority of the first railway vehicle relative to one or more other railway vehicles.

11. The system of claim 1 wherein the first processor is configured to modify the trip plan based on a previous operation of the first railway vehicle.

12. The system of claim 1 wherein the first processor is configured to modify the trip plan based on signal data received from a wayside device.

13. The system of claim 1 further comprising a controller element configured to be communicatively coupled with the first processor, the first processor configured to generate an output signal based on the trip plan, the controller element configured to autonomously control the first railway vehicle to follow the trip plan based on the output signal.

14. The system of claim 1 further comprising a display configured to be communicatively coupled with the first processor, the first processor configured to generate an output signal based on the trip plan, the display configured to display one or more indicia to an operator of the first railway vehicle to direct the operator to control the first railway vehicle in accordance with the trip plan.

15. The system of claim 1, wherein the first processor is configured to change one or more of the designated speeds of the trip plan when the actual speeds of the first railway vehicle deviate from the designated speeds of the trip plan by more than a designated difference.

16. The system of claim 1, wherein the first processor is configured to estimate a fuel efficiency of the first railway vehicle as the first railway vehicle travels during the trip, the first processor further configured to change the one or more of the designated speeds of the trip plan when the fuel efficiency that is estimated would be improved by changing the one or more of the designated speeds relative to the trip plan prior to changing one or more of the designated speeds.

17. The system of claim 1, wherein the trip plan is associated with a planned time of arrival that the first railway vehicle is scheduled to arrive at a destination location if the first railway vehicle travels according to the designated speeds of the trip plan, and the first processor is configured to determine a different estimated time of arrival that the first railway vehicle is estimated to arrive at the destination location, the first processor further configured to change the one or more of the designated speeds of the trip plan when the estimated time of arrival deviates from the planned time of arrival by more than a threshold time difference.

18. The system of claim 1, wherein the first processor is configured to communicate with a second processor on a second railway vehicle that concurrently travels with the first railway vehicle, the first processor configured to receive an advisement of a delay in travel by the second railway vehicle from the second processor and to change the one or more of the designated speeds of the trip plan for the first railway vehicle based on the delay in travel.

19. The system of claim 1, wherein the first processor is configured to monitor at least one of an increase or a decrease in tractive effort provided by the first railway vehicle during a previous trip of the first railway vehicle and at least one of create or modify the trip plan based on the at least one of the increase or the decrease in the tractive effort.

20. The system of claim 1, further comprising a locator element configured to determine locations of the first railway vehicle and to provide the locations to the first processor, wherein the first processor is configured to change the one or more of the designated speeds of the trip plan based on at least one of the locations received from the locator element as the first railway vehicle travels during the trip.

21. The system of claim 1, wherein the first railway vehicle includes at least a first locomotive and a second locomotive coupled with each other by at least one railcar disposed between the first locomotive and the second locomotive, the first processor configured to direct the first locomotive to provide a different tractive effort than the second locomotive to cause the first railway vehicle to travel at the designated speeds of the trip plan.

22. A method comprising:
   obtaining a trip plan for a first railway vehicle, the trip plan including designated speeds that the first railway vehicle is to travel along a railway for a trip, the designated speeds of the first railway vehicle expressed as a function of at least one of distance or time along the trip to reduce at least one of emissions generated or fuel consumed by the first railway vehicle during the trip relative to traveling according to one or more other speeds during the trip;

receiving speed information representative of actual speeds that the first railway vehicle is traveling along the railway during the trip;

determining differences between the actual speeds of the first railway vehicle and the designated speeds of the trip plan with one or more processors onboard the first railway vehicle; and changing one or more of the designated speeds of the trip plan with one or more processors onboard the first railway vehicle based on the differences between the actual speeds and the designated speeds as the first railway vehicle travels along the railway.

23. The method of claim 22, further comprising receiving an advisement of a delay in travel by a second railway vehicle that concurrently travels with the first railway vehicle, wherein changing the one or more of the designated speeds of the trip plan for the first railway vehicle occurs based on the delay in travel.

24. The method of claim 23, wherein the one or more of the designated speeds are changed based on a speed trajectory of the second railway vehicle.

25. The method of claim 24, wherein the one or more of the designated speeds are changed based on the speed trajectory of the second railway vehicle on a second track segment that is rearward of a first track segment that is occupied by the first railway vehicle relative to a direction of travel of the first railway vehicle.

26. The method of claim 23, wherein changing the one or more of the designated speeds includes modifying the trip plan to avoid the first railway vehicle and the second railway vehicle concurrently occupying a common track segment of the railway.

27. The method of claim 23, wherein the one or more of the designated speeds are changed based on at least one of track conditions of the railway or an operating condition of at least one of the first railway vehicle or the second railway vehicle.

28. The method of claim 23, wherein the one or more of the designated speeds are changed based on a relative priority between the first railway vehicle and the second railway vehicle.

29. The method of claim 23, wherein receiving the advisement of the delay includes receiving a location of the second railway vehicle based on location information received from at least one of a remote site or wayside equipment.

30. The method of claim 23, wherein the first railway vehicle and the second railway vehicle each comprise a train having at least one locomotive and one or more railcars.

31. The method of claim 22, wherein obtaining the trip plan includes receiving the trip plan from a location remote to the first railway vehicle.

32. The method of claim 22, wherein obtaining the trip plan includes creating the trip plan based on one or more travel parameters that include one or more of a scheduled destination location of the first railway vehicle, a current speed of the first railway vehicle, a type of the first railway vehicle, a scheduled time of arrival of the first railway vehicle at the scheduled destination location, a direction of travel of the first railway vehicle toward the scheduled destination location, or a priority of the first railway vehicle relative to one or more other railway vehicles.

33. The method of claim 22, wherein changing the one or more of the designated speeds is performed based on a previous operation of the first railway vehicle.

34. The method of claim 22, wherein changing the one or more of the designated speeds is performed based on signal data received from a wayside device.

35. The method of claim 22, further comprising autonomously controlling the first railway vehicle to follow the trip plan based on the designated speeds of the trip plan.

36. The method of claim 22, further comprising displaying one or more indicia to an operator of the first railway vehicle to direct the operator to control the first railway vehicle in accordance with the trip plan.

37. The method of claim 22, wherein changing the one or more of the designated speeds is performed when the actual speeds of the first railway vehicle deviate from the designated speeds of the trip plan by more than a designated difference.

38. The method of claim 22, further comprising estimating a fuel efficiency of the first railway vehicle as the first railway vehicle travels during the trip, wherein changing the one or more of the designated speeds of the trip plan is performed when the fuel efficiency that is estimated would be improved by changing the one or more of the designated speeds relative to the trip plan prior to changing one or more of the designated speeds.

39. The method of claim 22, wherein the trip plan is associated with a planned time of arrival that the first railway vehicle is scheduled to arrive at a destination location if the first railway vehicle travels according to the designated speeds of the trip plan, and further comprising determining a different estimated time of arrival that the first railway vehicle is estimated to arrive at the destination location, wherein changing the one or more of the designated speeds of the trip plan is performed when the estimated time of arrival deviates from the planned time of arrival by more than a threshold time difference.

40. The method of claim 22, further comprising presenting a plurality of potential trip plans to an operator of the first railway vehicle so the operator can select the trip plan from the plurality of potential trip plans for use in controlling movement of the first railway vehicle.

41. The method of claim 22, further comprising monitoring at least one of an increase or a decrease in tractive effort provided by the first railway vehicle during a previous trip of the first railway vehicle, wherein changing the one or more of the designated speeds is performed based on the at least one of the increase or the decrease in the tractive effort.

42. The method of claim 22, further comprising determining locations of the first railway vehicle, wherein changing the one or more of the designated speeds of the trip plan is performed based on at least one of the locations received from the locator element as the first railway vehicle travels during the trip.

43. The method of claim 22, wherein the first railway vehicle includes at least a first locomotive and a second locomotive coupled with each other by at least one railcar disposed between the first locomotive and the second locomotive, and further comprising directing the first locomotive to provide a different tractive effort than the second locomotive to cause the first railway vehicle to travel at the designated speeds of the trip plan.

* * * * *